(12) United States Patent
Pietsch et al.

(10) Patent No.: US 9,948,140 B2
(45) Date of Patent: Apr. 17, 2018

(54) HIGH EFFICIENCY CONTROL SYSTEM FOR THE CONVERSION OF ELECTRICAL ENERGY TO THERMAL ENERGY

(71) Applicant: KELVIN STORAGE INC., Toronto (CA)

(72) Inventors: Anton Pietsch, Del Mar, CA (US); George Lynch, Escondido, CA (US); Stephen B. Sutherland, Aurora (CA)

(73) Assignee: Kelvin Thermal Energy Inc., Toronto, ON (CA)

( * ) Notice: Subject to any disclaimer, the term of this patent is extended or adjusted under 35 U.S.C. 154(b) by 602 days.

(21) Appl. No.: 14/394,323

(22) PCT Filed: Apr. 12, 2013

(86) PCT No.: PCT/CA2013/000343
§ 371 (c)(1),
(2) Date: Oct. 14, 2014

(87) PCT Pub. No.: WO2013/152429
PCT Pub. Date: Oct. 17, 2013

(65) Prior Publication Data
US 2015/0108843 A1    Apr. 23, 2015

Related U.S. Application Data

(60) Provisional application No. 61/624,182, filed on Apr. 13, 2012.

(51) Int. Cl.
*H02J 15/00*    (2006.01)
*B60L 1/04*    (2006.01)
(Continued)

(52) U.S. Cl.
CPC ............. *H02J 15/00* (2013.01); *B60L 1/04* (2013.01); *B60L 3/0092* (2013.01); *B60L 8/003* (2013.01);
(Continued)

(58) Field of Classification Search
CPC .......... H02J 15/00; B60L 1/04; B60L 3/0092; B60L 8/003; B60L 11/1842;
(Continued)

(56) References Cited

U.S. PATENT DOCUMENTS 8,638,074 B2 *  1/2014  Babcock ............... H02M 1/425
                                                           323/207
2011/0289924 A1* 12/2011 Pietsch ............... F28D 20/0056
                                                           60/682

* cited by examiner

*Primary Examiner* — Hal Kaplan

(57) ABSTRACT

An improved control arrangement is used in a high power rectifier and comprises two or more power controllers ganged together in parallel. Each power controller rectifies an AC voltage signal using zero voltage crossing switching to produce a binary switched signal and each power controller is connected to an independent connectable load. Each power controller includes a fast acting binary power switch that selectively connects the respective independent connectable load to the rectified AC voltage signal. The control arrangement selectively activates the power controllers to define a desired connected load. This high power rectifier and control arrangement is advantageously used to provide fast up down power regulation to a grid by selective storage of thermal energy and deriving power from the thermal energy storage system to add fill in power to the grid.

16 Claims, 16 Drawing Sheets

Controlled 3-Phase Full Wave Rectifier

(51) Int. Cl.
    *H02J 3/00*     (2006.01)
    *B61H 9/06*     (2006.01)
    *B60T 1/10*     (2006.01)
    *B60T 13/58*     (2006.01)
    *H02M 7/06*     (2006.01)
    *H02M 7/217*     (2006.01)
    *B60L 3/00*     (2006.01)
    *B60L 8/00*     (2006.01)
    *B60L 11/18*     (2006.01)
    *B60L 15/00*     (2006.01)

(52) U.S. Cl.
    CPC ......... *B60L 11/1842* (2013.01); *B60L 15/007* (2013.01); *B60T 1/10* (2013.01); *B60T 13/586* (2013.01); *B61H 9/06* (2013.01); *H02M 7/066* (2013.01); *H02M 7/2176* (2013.01); *B60L 2200/26* (2013.01); *B60L 2210/30* (2013.01); *Y02E 60/721* (2013.01); *Y02T 10/645* (2013.01); *Y02T 10/7005* (2013.01); *Y02T 10/7072* (2013.01); *Y02T 10/7083* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01); *Y10T 307/685* (2015.04)

(58) Field of Classification Search
    CPC ............... B60L 15/007; B60L 2200/26; B60L 2210/30; B60T 1/10; B60T 13/586; B61H 9/06; H02M 7/066; H02M 7/2176; Y10T 307/685; Y02E 60/721; Y02T 10/645; Y02T 10/7005; Y02T 10/7072; Y02T 10/7083; Y02T 10/7241; Y02T 90/121; Y02T 90/127; Y02T 90/128; Y02T 90/14; Y02T 90/163; Y04S 10/126
    USPC .......................................................... 307/77
    See application file for complete search history.

Figure 1: Standard 3-Phase Full Wave Rectifier (PRIOR ART)

Figure 2: Controlled 3-Phase Full Wave Rectifier

Figure 3: Zero Voltage Crossing 3Φ Heater Controller Block Diagram

Figure 7: 3-Phase and 2-Phase Full Wave Rectified Voltage with Mains Reference for 220 VAC Figure 9: Single Cycle (50 or 60 Hz) Controlled Load Voltage using Inter-Phase Zero Voltage Difference for Switch Points Figure 10: 4-Wire "Y" 3Φ-Independently Controlled Full Wave Rectifiers with Load Resistors Figure11:3-Phase Heater Controller Block Diagram Figure 12: Energy Storage Control for Grid Interconnection.

Figure 13: Energy Storage for Grid Interconnection.

Figure 14: Addition of Energy Storage to Solar Power (PV) Field.

Figure 15: Three Phase 660 VAC 10-Step Power Ramp 0 to 700 kW in 160 msec

HIGH EFFICIENCY CONTROL SYSTEM FOR THE CONVERSION OF ELECTRICAL ENERGY TO THERMAL ENERGY

This application claims priority from U.S. Provisional Application Ser. No. 61/624,182 filed Apr. 13, 2012 and is incorporated herein by reference.

FIELD OF THE INVENTION

The subject matter described herein generally relates to conversion of electrical energy from an alternating current (AC) high power source to direct current, preferably used as an input for an energy storage system.

BACKGROUND OF THE INVENTION

Dynamic braking has been used in railroad and transit applications to convert braking energy to heat or electrical power, for example by use of one or more electric traction motors of a railroad vehicle for electrical power generation when braking. Such electro-dynamic braking generally significantly lowers the wear of friction-based braking components. In dynamic braking, resistors can be provided to dissipate braking energy, typically by engaging one or more resistors within a bank (a collection of resistors) or one or more entire banks of resistors. In the absence of equipment to store and then convert the resulting heat back to electricity to power the train when later accelerating, such systems typically utilize forced air cooling to simply discharge the braking energy as heat to the atmosphere.

The size of resistive heating loads found in both light and heavy rail can be considered as representative of the loads that can be controlled by some implementations of the current subject matter. The current subject matter is not limited by load or voltage. However, some implementations can be advantageously applied when a supply voltage is significantly higher than a sum of the forward voltage drops of the controlled rectifier components (at least 10 to 1 ratio) under various design conditions.

Mechanically switched unit resistor load stepping is generally not suitable for cases where the resistive load needs to be switched on or off very rapidly to and from the electrical distribution source. Once activated or deactivated, a mechanical switch or relay generally makes contact one or more times and at an unknown position in the phase of each line, which can lead to significant voltage transient spikes.

High rates of change in power when a load is suddenly connected at or near full power can generate a rapid change in the temperature of the heater or heaters. This temperature change can accelerate the damage done by thermal shock and eventual device failure at one or more mechanically weakest connections or any electrical "hot spot." The sudden power draw or removal coming from massive load switching can overwhelm and possibly damage the electrical motor/generators providing power to the grid. The harmonics and sub-harmonics produced by such a power change can be significant enough to adversely affect portions of the grid (micro-blackouts or brownouts), particularly in distribution areas electrically "close" to the high power switched load or when the grid transmission equipment is near its load limit.

Existing high power precision load controllers with active electronic components typically utilize Pulse Wave Modulation (PWM) of the rectified input mains. Fixed voltage output PWM controllers have reached a composite efficiency of nearly 98.5% (frequently referred to as switching power supplies) and may be found at a wide range of output voltages and power limits. Variable voltage output PWM controllers can typically operate at about 89% efficiency with many models unable to achieve stable low output voltages, causing a typical lower limit of about 1% to 5% of rated output voltage. If the load to be controlled is on the order of megawatts for high demand applications, even a loss of 2% source power reaching the load can result in very significant control electronics power consumption. In addition to being wasteful, the resulting heat must be removed in continuous operation of the system. For example, a 2% loss of a 1 MW load results in 20 KW that goes to the power control components and that can require large, expensive, and less reliable cooling to accomplish accurate load balancing.

In addition, the high frequency switching of PWM can introduce unwanted harmonics and some amount of phase shift to the input power source (AC Mains) due to the reactive (inductance, capacitance) circuit design that makes PWM possible. These harmonics and phase shifts can be compensated for with a more sophisticated design, but at the expense of even lower output efficiency, in addition to more controller components and complexity.

It can be desirable for high power switching to behave as a controlled load for connection to AC mains. However, mechanical contact switches generally cannot be turned on or off with sufficient speed or accuracy to avoid creating random transient excursions on the grid as the electrical switching occurs. Particularly when significant portions of a regional grid are at or near the limit of available generating capacity, the spikes produced by making or breaking of such large loads in an unsynchronized manner can often be sufficient to trigger one or more power line condition protection circuits of connected facilities and to cause them to disconnect from the grid, even if momentarily, which can in turn trigger even greater transients. This effect can therefore lead to a series of overload failures that quickly overwhelms a power grid's ability to accommodate them in a controlled fashion, and can in some cases even escalate to become a serious brownout or blackout major portions of the grid, as was recently demonstrated by the blackout from Phoenix to San Diego.

Accordingly, the current state of the art for high power precision load control or modulation leaves significant room for improvement. As presented in the accompanying diagrams and descriptions, implementations of the current subject matter can include systems, articles of manufacture, methods, techniques, etc. that can improve upon one or more of the above-noted deficiencies or that can provide one or more other benefits or advantages relative to currently available approaches. In addition the specification begins to address some of the related problems associated with integration of large amounts of renewable wind and solar energy. It directly addresses low base load conditions by enabling the controlled, rapid, efficient and precise variation (the "taking") of large amounts of power load sufficient to counter-balance the large and relative fast changes in electrical energy production of these resources.

The production of large amounts of wind and/or solar energy is an important goal related to renewable resources and achieving national energy security. To accommodate the difference between the temporal distribution of energy generation from such sources (e.g. most wind energy is generated at night, and solar energy does not match the load curve to varying degrees with seasonal changes), storage of generated energy can be necessary. Such energy storage desirably can include capacity sufficient for periods of regeneration time from one hour upwards depending on the level of reserve desired to balance the load curve. With the addition of recharging components and a large capacity storage unit, dynamic loading can also be used to store and regenerate electrical energy. This energy can advantageously be capable of being taken from the AC mains grid and placed into storage under precise high-power (on the order of a megawatt to more than a gigawatt) control.

As an additional consideration, electrical utilities typically demand that loading of the grid (for example by an electrical storage unit) appear as much as possible to be a purely resistive element with no reactive elements that can cause shifts in the phase between a generation source and a connected load, and that such loads appear to be purely resistive elements throughout the dynamic range of power/energy going into or out of storage. The nullification of reactive loading can result in a power factor at or near 1.0, meaning that little or none of the energy received for storage is reflected by reactive components back onto the grid. Since the storage power load can be variable, the use of fixed reactive compensation is generally precluded. Rather, a storage load must be capable of compensating dynamically to match the amount of power taken from the grid. Storage efficacy can be defined by a combination of factors, including, for example, cost and efficiencies of the conversion of electrical energy into storage media, the storage self-discharge rate, and conversion back from the storage media to the grid. For the example of grid storage and retrieval, implementations of the current subject matter can address approaches suitable for highly efficient conversion of electrical energy into thermal energy, whereupon it may be transferred to storage. The concept of high-efficiency conversion of very large amounts of AC electricity to direct current provided as an input to a load is not limited to storage applications.

SUMMARY OF THE INVENTION

According to the invention a control arrangement is used in a high power rectifier. The control arrangement comprises two or more power controllers ganged together in parallel. Each power controller rectifies an AC voltage signal using zero voltage crossing switching to produce a binary switched signal and each power controller is connected to an independent connectable load. Each power controller includes a fast acting binary power switch selectively connecting the respective independent connectable load to the rectified AC voltage signal. The control arrangement selectively activates the power controllers to define a desired connected load.

According to an aspect of the invention, each independent connectable load converts the rectified AC voltage signal to an alternate energy form stored in an energy storage system.

In a further aspect of the invention, the alternate energy form is thermal energy.

In yet a further aspect of the invention, each independent load includes a series of resistive elements distributed within the energy storage system and cooperates with the energy storage system to efficiently transfer thermal energy from the resistive elements to the energy storage system. The control arrangement is capable of switching each binary power switch multiple times within a cycle of the AC voltage signal and the AC voltage signal is 3 phase. Preferably, the two or more controllers are at least 10 controllers. In a further preferred embodiment each controller has a maximum rated power of at least 70 megawatts.

In a preferred aspect, each control arrangement includes control logic for incrementally activating the controllers to dynamically increase or decrease loading of the energy storage system in a predetermined manner to reduce transients caused by connecting or disconnecting the separate loads to or from the energy storage system.

In a preferred aspect, each control arrangement includes a phase balancing procedure that selectively activates the controllers to process the single phase input signals to provide at least a partial corrective response to a detected unbalanced condition of the input signal.

In a different aspect of the invention, a power storage and generation system is connected to a grid supply network, where the power storage and generation system comprises a thermal energy storage system connected to the grid supply network for receiving electrical power to be thermally stored. The thermal energy storage system includes thermal conversion outputting components for converting thermal energy of the thermal storage system into electrical energy provided to the grid supply network. The thermal storage system is divided into a series of thermal storage units with each unit including electrical power input components for receiving electrical power from the grid supply network and converting the received electrical power to thermal energy stored in the thermal storage system. Additionally the electrical power input components for each thermal storage unit comprise a power controller that selectively rectifies a three phase AC voltage signal using zero voltage crossing switching to produce a binary switched signal. Each power controller is connected to an independent connectable load that when powered produces thermal energy and the independent connectable load is associated with the thermal storage unit and transfers thermal energy to the thermal storage unit. Each power controller includes a fast acting binary power switch selectively connecting the respective independent connectable load to the rectified AC voltage signal, and the control arrangement selectively activates the power controllers to define a desired connected load.

In a preferred aspect of the power generation system, a power management controller for the series of thermal storage units is used where the power management controller selectively activates the controllers in a predetermined manner to provide a power receiving transition period for the grid supply network that reduces switching transients produced by activating any of the controllers. Preferably the independent loads are each a series of thermal resistors distributed within the thermal storage body.

In a further aspect of the invention, the timing arrangement identifies voltage crossover points between the different phases of the AC input signal and during a load increasing transition period switching occurs to progressively increase the rectified AC signal provided to the resistive load.

In a further aspect of the invention, the power generation system includes a solar generation source having a series of solar panels, the solar generation source having a variable output dependent upon solar power generating conditions, a DC to AC converter connected to the solar generation source for receiving DC power from the solar generation source and supplying AC power to the grid supply network.

The power generation system further includes an energy control system monitoring the grid supply network and the solar generation source to identify transients or power conditions that adversely affect the grid supply network. The energy control system increases or decreases the AC power provided to the grid supply network to partially offset the identified transients or power conditions that adversely affect the grid supply network. The energy control system increases AC electrical power outputted to the grid supply network by adjusting the output of the thermal conversion components.

The energy control system decreases AC electrical power provided to the grid supply network by receiving AC electrical power from the grid supply network or AC electrical power of the solar generation source and provides the received AC electrical power to the thermal storage system input components for thermal energy storage.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

The details of one or more variations of the subject matter described herein are set forth in the accompanying drawings and the description below. Other features and advantages of the subject matter described herein will be apparent from the description and drawings, and from the claims. When practical, similar reference numbers denote similar structures, features, or elements.

Throughout the diagrams, descriptions, and summary of a non-limiting, illustrative implementation used as an example here, the discussion assumes that the power source is 220 VAC at 60 Hz, and the full resistive load may reach a maximum of 6 kW power for each modular, scalable load controller. The parasitic reactive components of the load are considered to be negligible. Resistive heating elements typically have extremely small reactive element contributions which will be ignored in this discussion.

DETAILED DESCRIPTION

In some example applications in which implementations of the current subject matter can provide benefits, a high power AC source can be the distribution level (currently defined as 70,000 Volts or less) of electrical transmission utility, or an independent generating station, micro-grid, or other managed electrical power distribution network. The thermal energy may then be utilized as part of energy storage, manufacturing processes, or other useful purposes in which precision control of at least one of heat flow and temperature is desired. The amount of energy converted can be varied in scalable steps for the precision desired from zero to one hundred percent of the attached load, and can be capable of delivering different amounts of power to different segments of a load or separate loads, depending on the number of resistive load elements and their distribution amongst multiple load controller modules connected to one or more master load management controllers.

Figure 1:
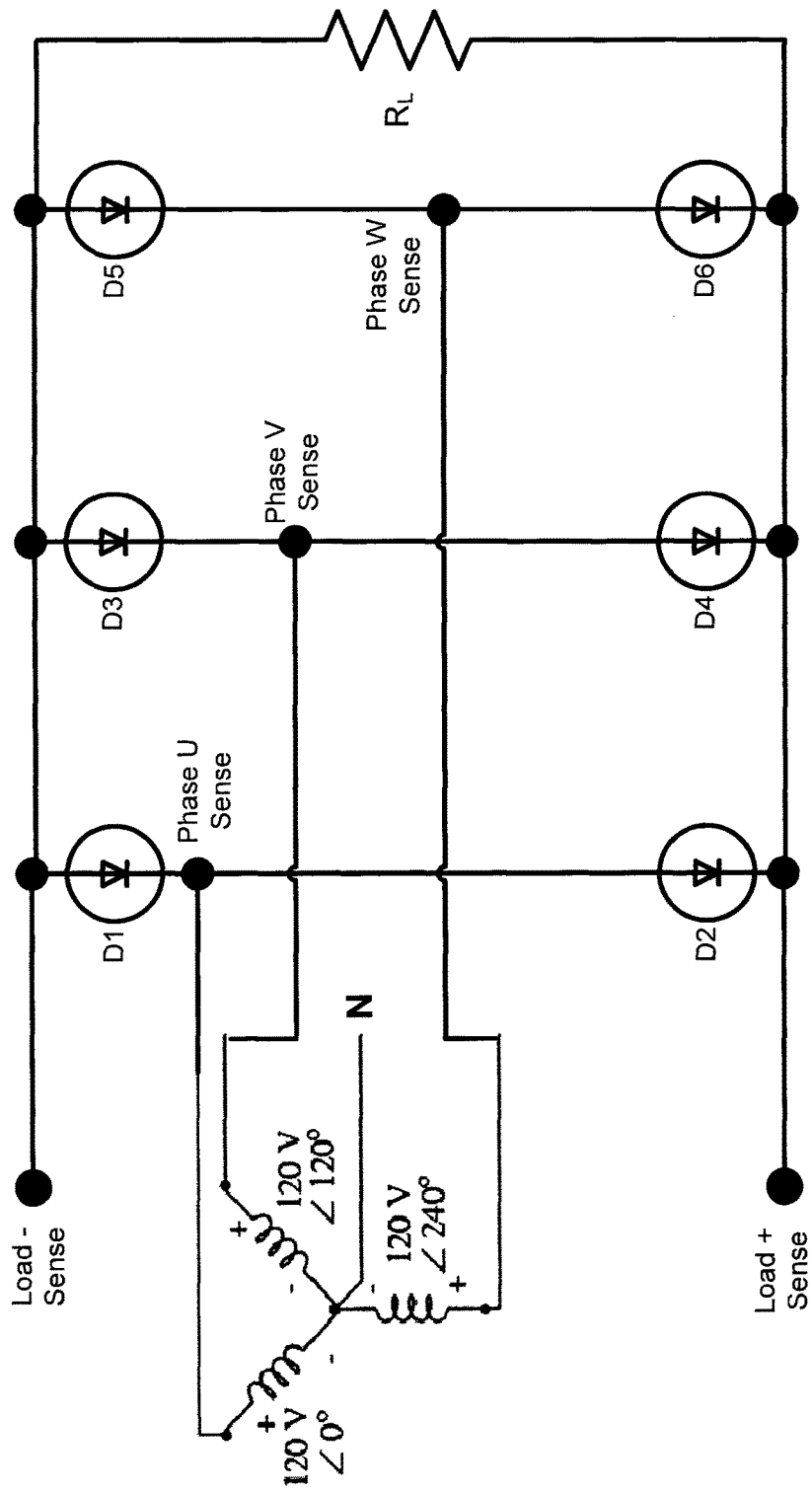
FIG. 1 shows a circuit diagram illustrating aspects of a standard baseline three-phase full wave rectifier system.

FIG. 1 is a schematic diagram illustrating key aspects of a standard baseline three-wire three-phase full wave rectifier circuit for converting alternating current line voltages into an unfiltered direct current two-wire load, and is incorporated as a standard reference design.

Figure 2:
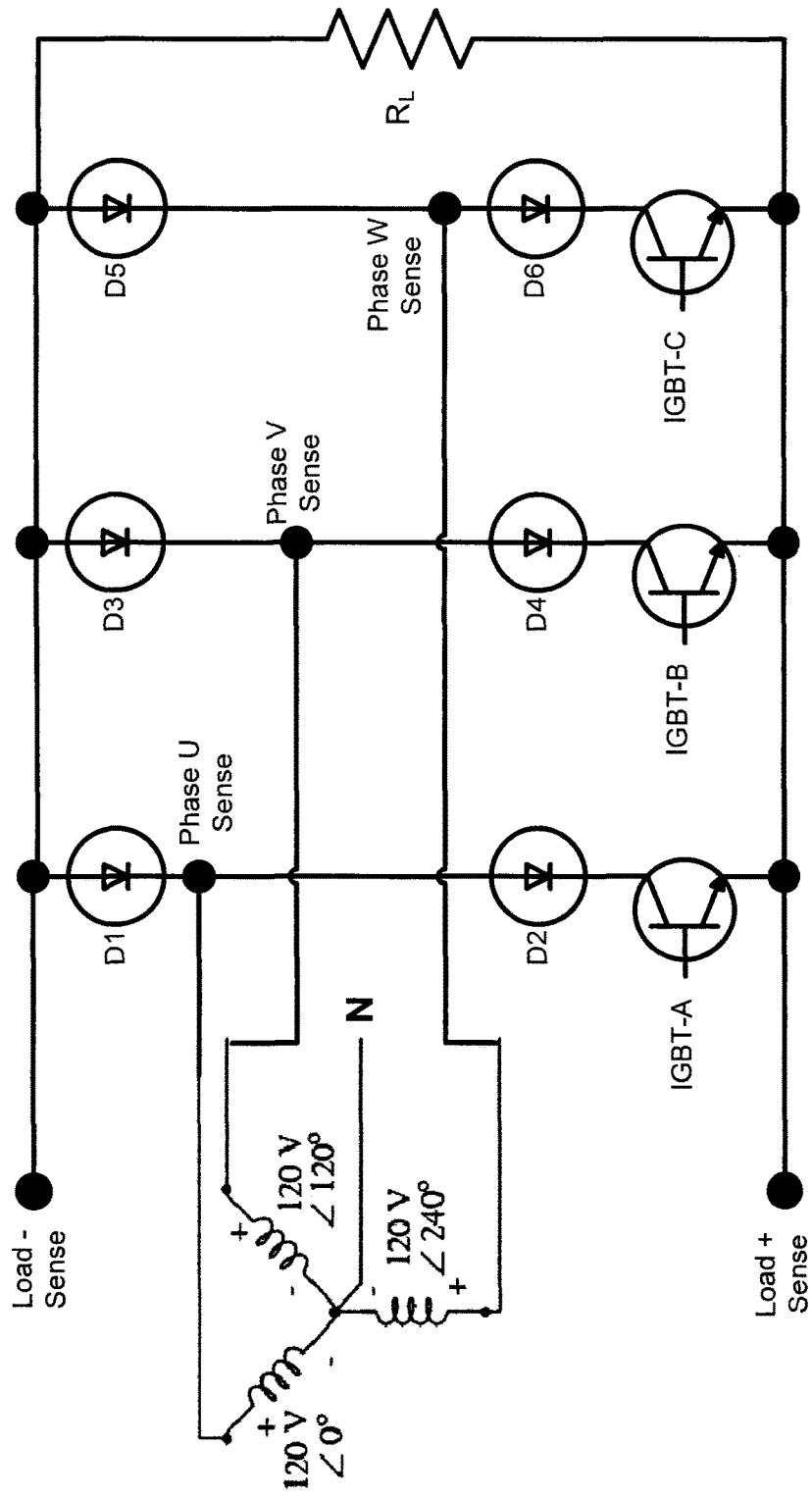
FIG. 2 is a circuit diagram illustrating aspects of a modification to the standard baseline full wave rectifier system with single sided high current control consistent with implementation of the current subject matter.

FIG. 2 depicts modifications to the approach illustrated in FIG. 1. These modifications incorporate aspects and partial design details consistent with one or more implementations of the current subject matter. It should be noted that the modifications shown in FIG. 2 and discussed herein represent one approach to realizing one or more advantages of the current subject matter and may represent one approach among many possible. Three IGBTs (Isolated Gate Bipolar Transistor) can be inserted at the positive voltage side of the rectifier bridge to permit separate switching control of that side of the load for each of the source power phases in a 3-phase supply inter-connection, which are labeled as A, B and C at their respective gates. Only half of the bridge rectifier is modulated in this implementation, leaving the other half of the bridge diodes connected at all times. Among other possible benefits, this modification can provide independent high power electronic control for switching each of the three power supply phases into and out of carrying current, and can also minimize the forward voltage presented by the resulting bridge rectifier. In practice, the controlled bridge rectifier electronic "stack" will sum to become the direct, in-line parasitic load.

The control gated electronic load can represent the most significant direct power loss, and can be determined with standard electronic component $I_f/V_f$ performance curves to compute the line to load power efficiency. Any loss from the power control electronics can become waste heat in the components that must be removed as it is produced to prevent over-heating and potential destruction of the active device. By placing the controlling IGBTs in only half of the diode rectifier bridge, one high value voltage drop results (from the complimentary side's control switch), and a significant amount of power loss can be eliminated such that the resulting control bridge is fully able to switch the resistive load on and off.

Since this design leaves half of the possible phase switches available and on a single side of the bridge, full control of all the possible independent phase currents can be reduced, thereby limiting the amount of power control within a single 3-phase voltage cycle. No restriction is placed on the choice of power components for the controlled rectifier bridge except for those limits imposed on parameters that would ordinarily be placed on the design. Accordingly, other implementations are capable of using other standard switching components to reduce the occurrence of parasitic loads that can cause loss of efficiency. By judicious design of the switching bridge rectifier, both sides and all three phases can be controlled while reducing the electronic component voltage drop stack value, which can in turn result in even higher operational efficiency and less waste heat to extract. As such, advanced components can result in implementations that retain the benefits of high efficiency and high power control of resistive loads while enabling additional features to be included.

Figure 3:
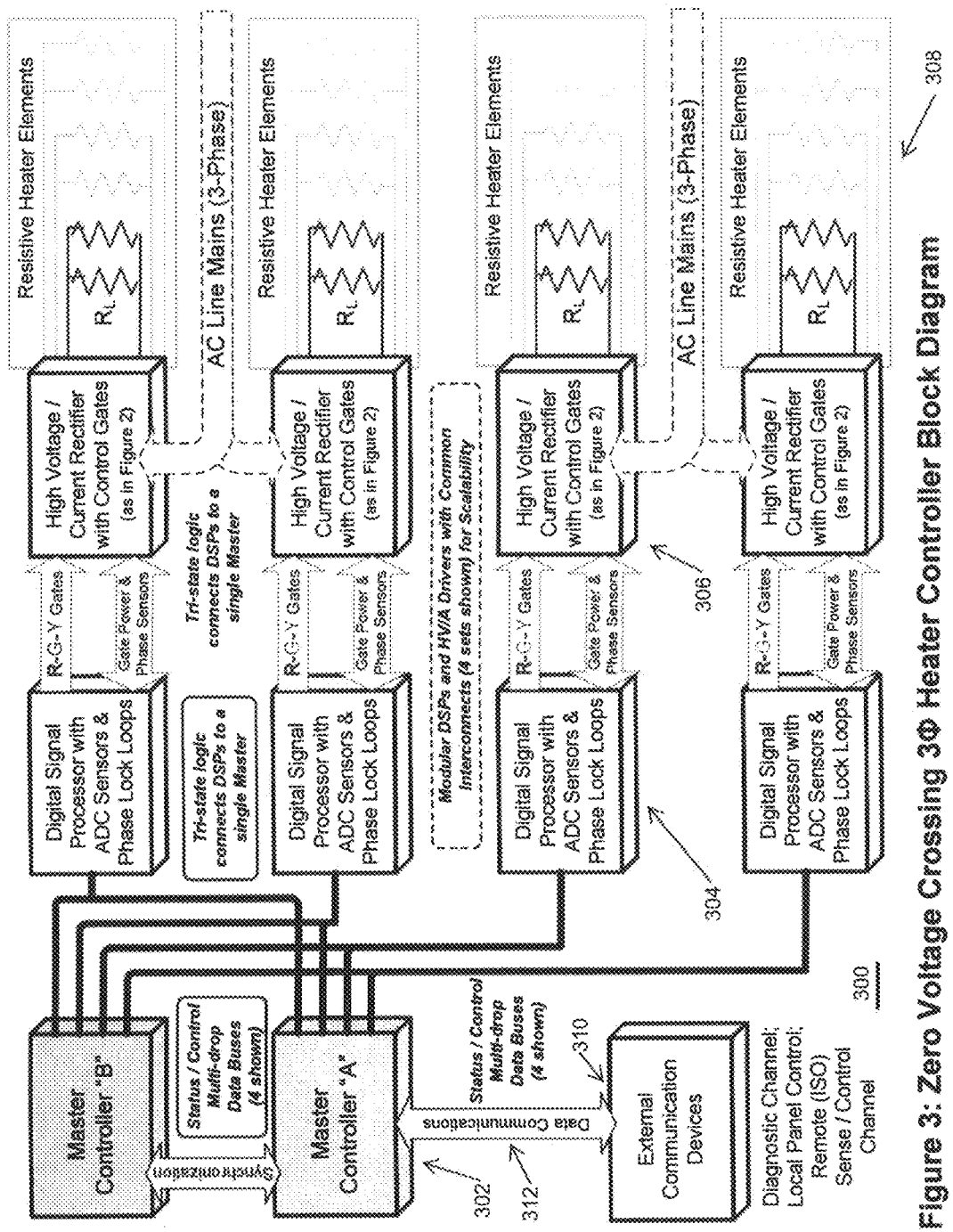
FIG. 3 shows an electronic process flow diagram illustrating aspects of a method for a modular block control system comprised of four resistive heater banks having one or more features of the associated power and control elements (as shown in FIG. 2) consistent with implementations of the current subject matter.

FIG. 3 shows an electronic process flow diagram illustrating aspects of a method for a scalable, modular control system having four resistive heater banks in this example. System 300 of this figure incorporates one or more features of the associated power and control elements consistent with implementation of the current subject matter.

A pair of control and regulation units connected as a Master/Backup pair 302 is shown in a preferred implementation to provide a degree of fault tolerance. Use of more than one Master Controller is optional, and all Masters are connected through a common communications bus 312 to each other and the External Communications Interface 310. Module 310 performs routine time-based arbitration of the Master Controllers to determine and set the currently active Master controller. The External Communications Interface also contains hardware that connects the Master Controller collective to various remote control and sense units by implementing their preferred external hardware and software protocols.

Each of electronic modules 302, 304, 306 and 310 can include one or more computer processors or the like (such as a DSP or FPGA), a memory storing computer code for execution by the one or more processors, and one or more communications interfaces as needed. Determination of the necessary number and performance characteristics of such processors can be performed consistent with principles and approaches of real time systems design according to the needs of a specific installation using one or more features described herein. One or more communications channels for obtaining pre-processed status and data and sending commands to selected DSP (Digital Signal Processors) 304 can be included for control of the resistive load groups (heaters in this implementation). In an implementation, separate computing systems, communications channels, and the like can be provided for each load or for a group of loads.

The DSPs can each control, in high resolution time, the switching activity for one or more load groups and one or more interfaces for receiving data from sensors (e.g. heat sensors, pressure sensors, voltage or current sensors, etc.) that monitor the operation of the other components of the system 300. These controllers can also provide low voltage DC power for operating a phase switch bank 306 that provides high voltage and current to a resistive load group 308. Together, the phase sensor points and the load sense points can be digitized and utilized to determine the status of the mains power as well as faults in the resistive load and good one or more pieces of information on the status of the power switching control components located on FIG. 2, which is represented in FIG. 3 as one of the DSP modules 304.

Collectively, the approach illustrated in FIG. 3 and consistent with the descriptions provided herein can represent minimal element types and interconnects that can be required to provide a resistive load control of the electronic system 300 in FIG. 3. The target resistive load selected for the illustrated example includes of four groups of high power heater elements (six heater resistors in each group) connected in parallel as a representative configuration. Each load under independent control contains at least one resistive element or optionally a collection of such elements 308 configured such that the elements appear as a single resistor to any single high power control module 306. An implementation of the current subject matter can optionally include at least one Load Control (one DSP connected to one HV/A module, 304 and 306 paired) as well as one External Interface module 312 connected to at least one Master Control module 302, or their collective equivalent functional elements. Additional Master Control modules and/or Load Control module sets can be optional and can represent an opportunity or capacity for scaling an implementation of the current subject matter to handle larger aggregate loads by utilizing multiple discrete load elements with the resistance value(s), resistor quantity and configuration desired.

Figure 4:
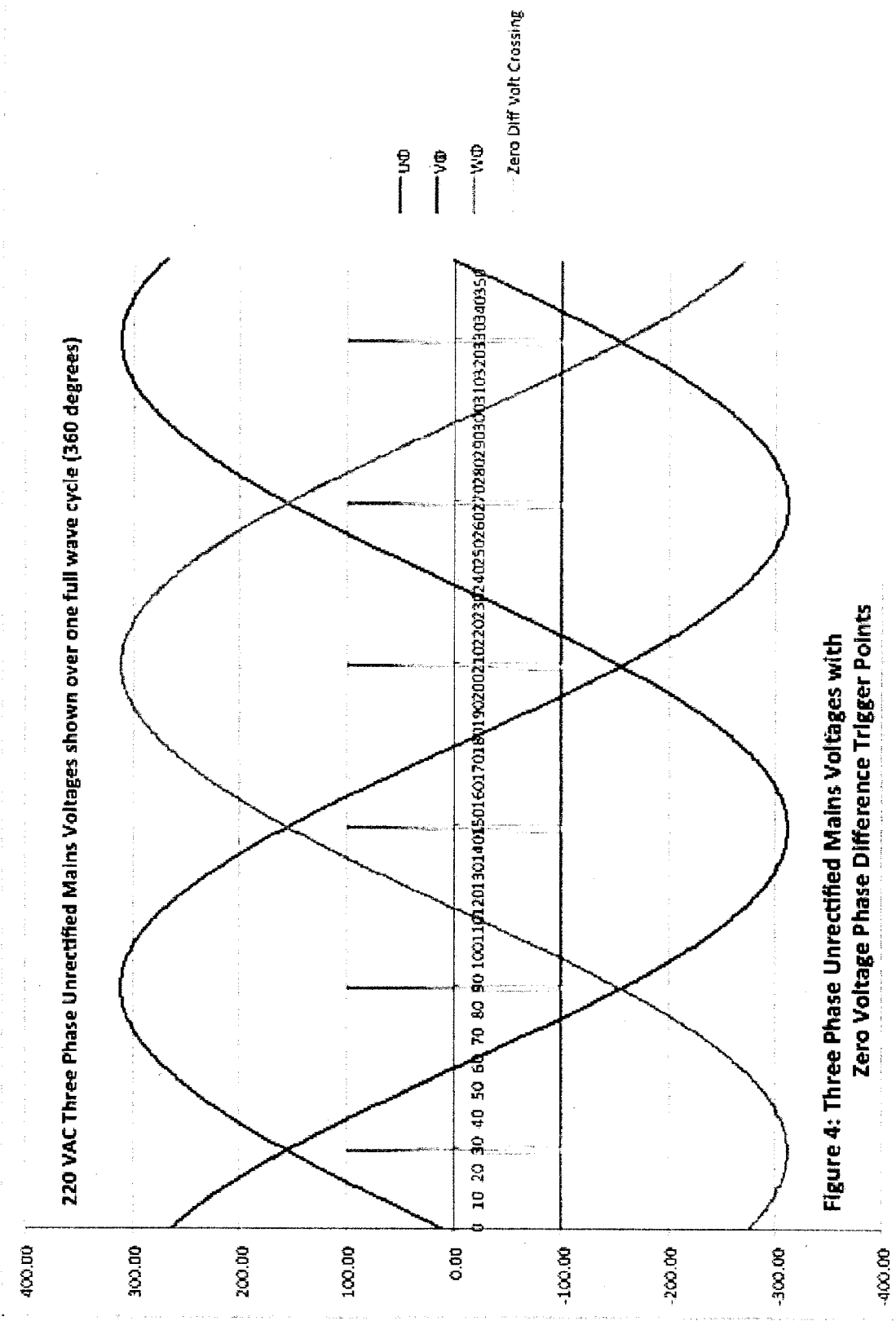
FIG. 4 is a graph showing data for a typical idealized three phase single cycle with voltages as a function of phase angle traversing 360 degrees of that cycle, with indications as to where different pairs of phase drive lines may be switched without significant transient production.

FIG. 4 shows a reference chart of a single cycle of 60 Hz standard US 220 VAC three-phase service with ideal line voltages. Computed pulse markers indicate in FIG. 4 where two of the three phases will cross and simultaneously have the same relative supply voltages. These virtual markers can be used as switch-point activation/deactivation periods to accomplish one or more of increasing the composite upward voltage direction, decreasing the composite downward voltage direction, and disabling power entirely at the load controller by selecting the same phase for both the high and low load voltage sources.

Figure 5:
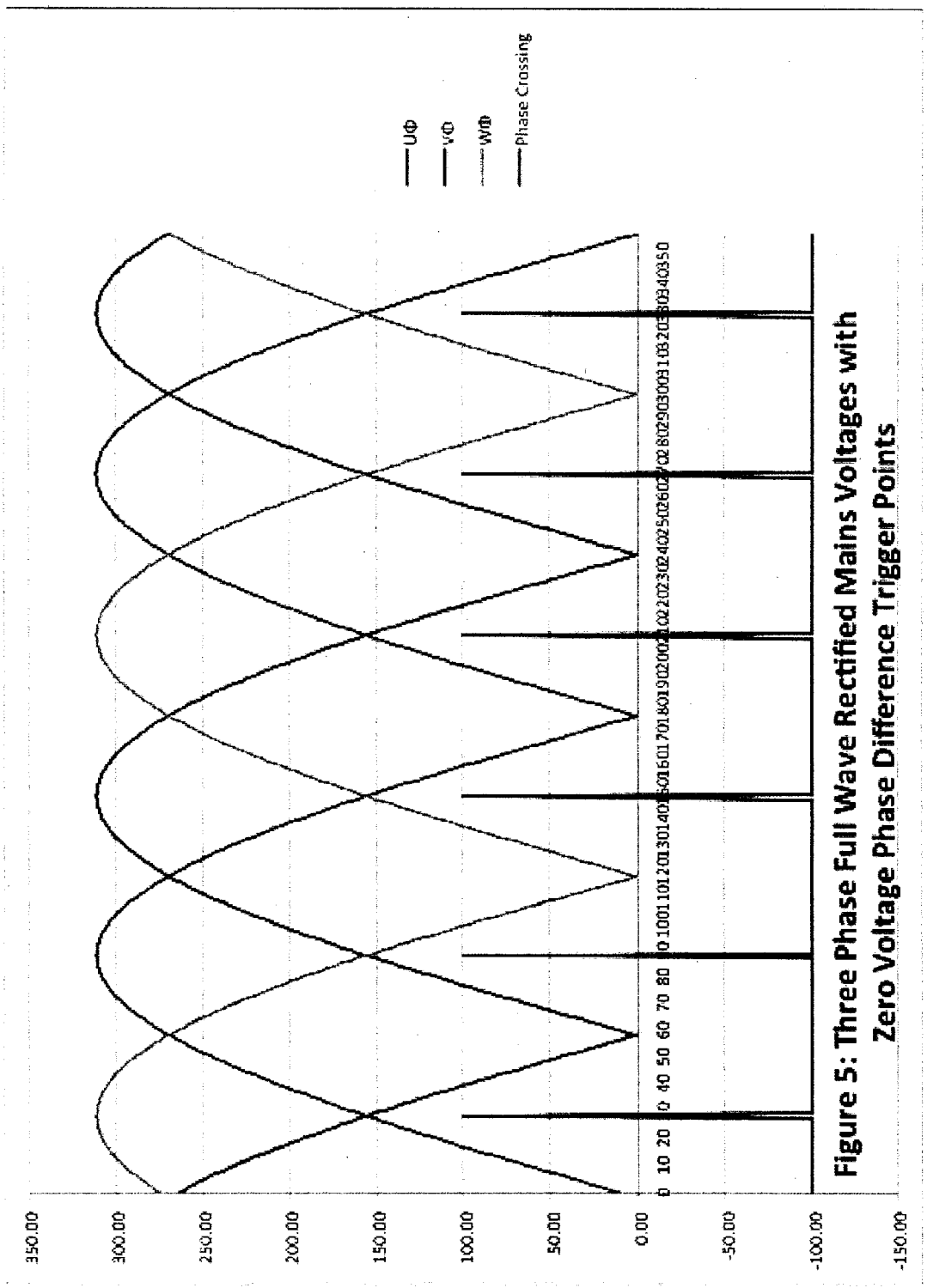
FIG. 5 is a graph illustrating the idealized cycle in FIG. 4 as full wave rectified to be representative of the output of a simple rectifier circuit as found in FIG. 1.

FIG. 5 shows another chart of an identical single cycle of 60 Hz standard US 220 VAC three-phase service as represented in FIG. 4, but with ideal line voltages that have been fully three-phase bridge-rectified. The computed pulse marker plot indicating available switch-point periods from FIG. 4 is retained and unchanged. The full bridge rectification can produce supply voltages that are now unipolar. The time-based phase angle voltages can be symmetric and uniformly distributed.

This diagram illustrates a relationship between computed pulse markers and their corresponding phase pair voltage crossings. Active switching between the indicated discrete phases of a pair at that particular cycle angle marker (or more accurately where the phase voltages of the pair match) can advantageously avoid causing the attached load to experience any significant instantaneous change in delivered power or current or optionally, no instantaneous change in delivered power or current at all. Since the power change can be zero or effectively zero when the net voltage change across the load is zero, any such phase switching can produce little or no transient spike that could otherwise be injected back into the power source.

Because transient spikes experienced by the load can be reduced or even eliminated during the phase switchover, this action can advantageously produce little or no change that would otherwise result in the significant power spikes that might cause a rapid temperature change. Such power spikes can potentially cause thermal shock to the load and control switches (IGBTs in this implementation) or other directly connected electrical devices and can therefore result in the premature degradation and eventual destruction of these components.

Figure 6:
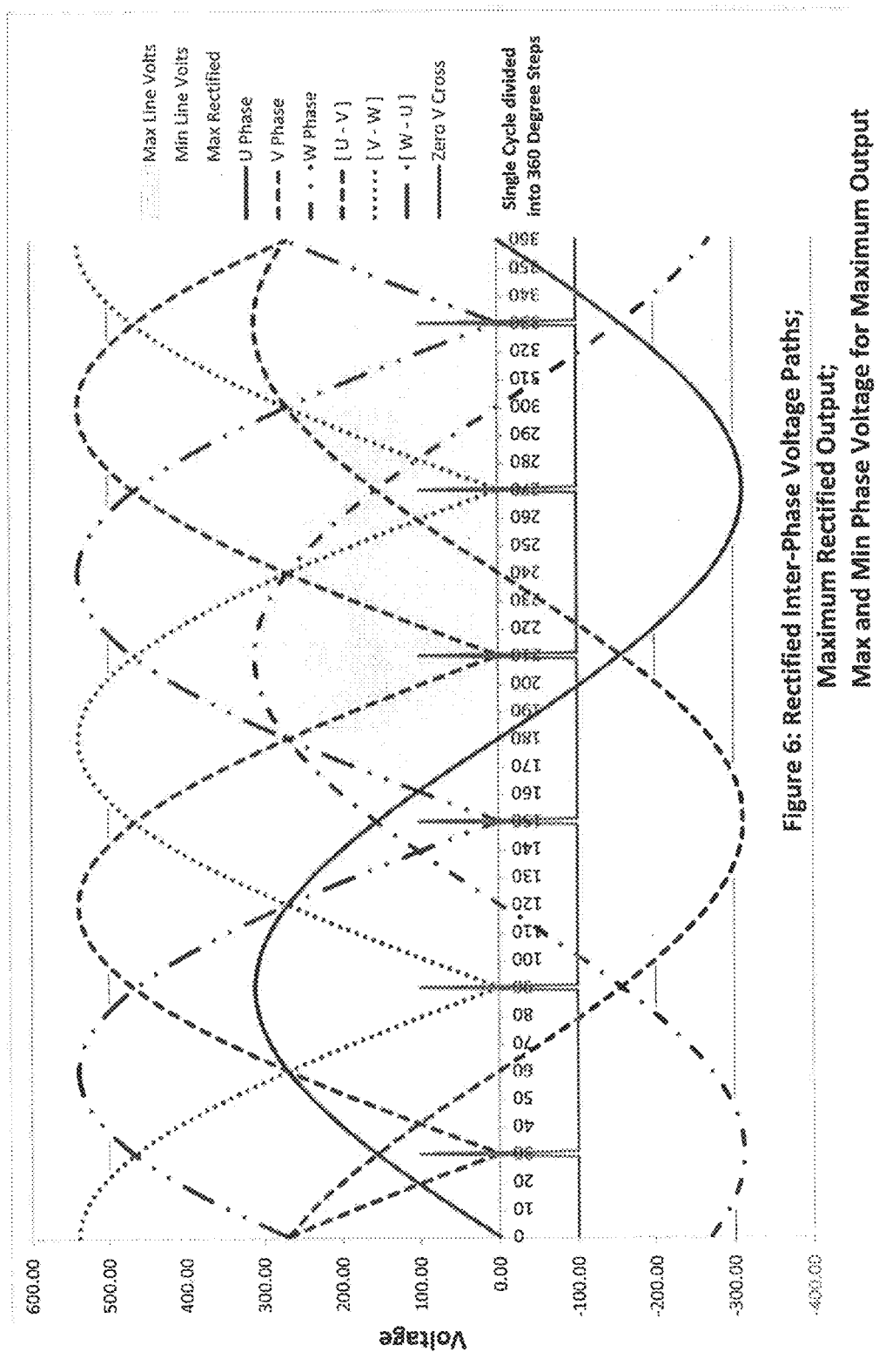
FIG. 6 shows another graph based upon aspects of FIGS. 4 and 5 to demonstrate multiple aspects of a method having one or more features consistent with implementations of the current subject matter.

FIG. 6 shows another chart of the identical 60 Hz single cycle that further elucidates the relationships between the incoming 3-phase voltages and their corresponding bridge rectified voltage paths. Highlighting portions of the various waveforms demonstrates how the source voltages with their sinusoidal shape and frequency can be folded together to produce the desired controlled output load waveform for the highest efficiency delivery of power to the resistive load.

Source phase voltages can be taken (or current can be allowed to flow) at their respective absolute minima and maxima for each phase angle point to identify the waveform segment phases chosen for the composite load waveform produced. Operationally, each segment can use two phases that can be electronically selected for their minima and maxima waveforms, and taken and combined during rectification to produce the desired single output waveform for driving a specific resistive load. The source phase waveform segments that comprise the composite absolute minima and maxima are highlighted by a thickening of the particular segment phase voltage selected to permit current to flow to the load. For the first segment from 30° to 90°, the source phase minimum can be identified by a dashed line with the code letter "W" (phase identifications are usually made by arbitrary sets of three capital letters, one for each phase). The corresponding first segment maximum is identified by a solid line and the code letter "U". The other segment is the dotted line and the code letter "V". To complete the cycle's segmented phase voltage waveforms selection, the following table relates cycle segments 1 through 6 (not directly shown) with their segment angle bounds and phase ID for the corresponding minimum and maximum phase voltages.

Load Control Phase Matrix

| Phase Segment | Starting at Phase Angle | Ending at Phase Angle | Low Voltage Φ Selection | High Voltage Φ Selection |
|---|---|---|---|---|
| 1 | 30° | 90° | W Φ | V Φ |
| 2 | 90° | 150° | W Φ | U Φ |
| 3 | 150° | 210° | V Φ | U Φ |
| 4 | 210° | 270° | V Φ | W Φ |
| 5 | 270° | 330° | U Φ | W Φ |
| 6 | 330° | 30° | U Φ | V Φ |

Figure 7:
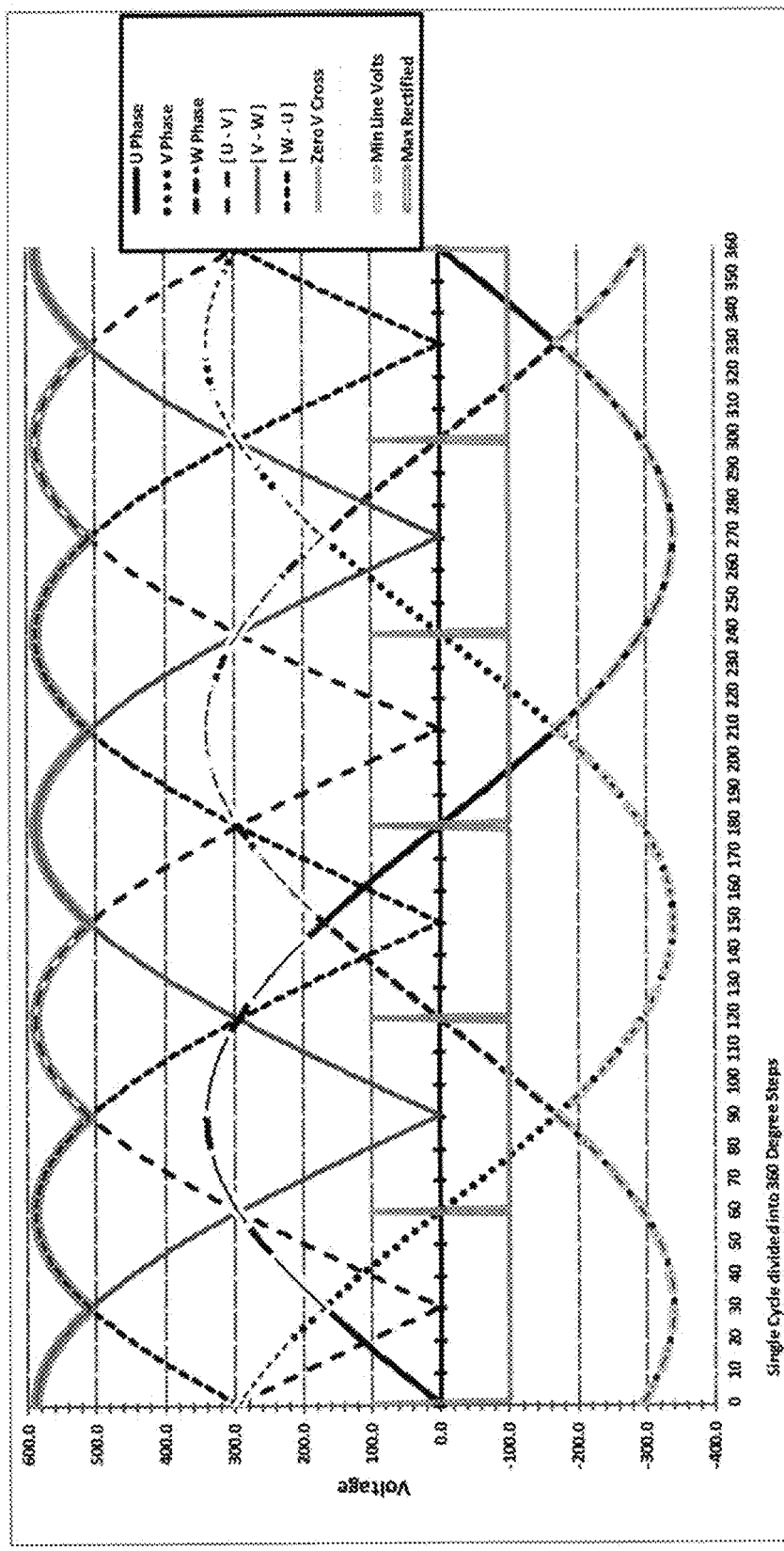
FIG. 7 shows a simplified chart diagram derived from FIG. 6 that illustrates both 3-phase and 2-phase rectified output that produces the maximum power for each.
Figure 8:
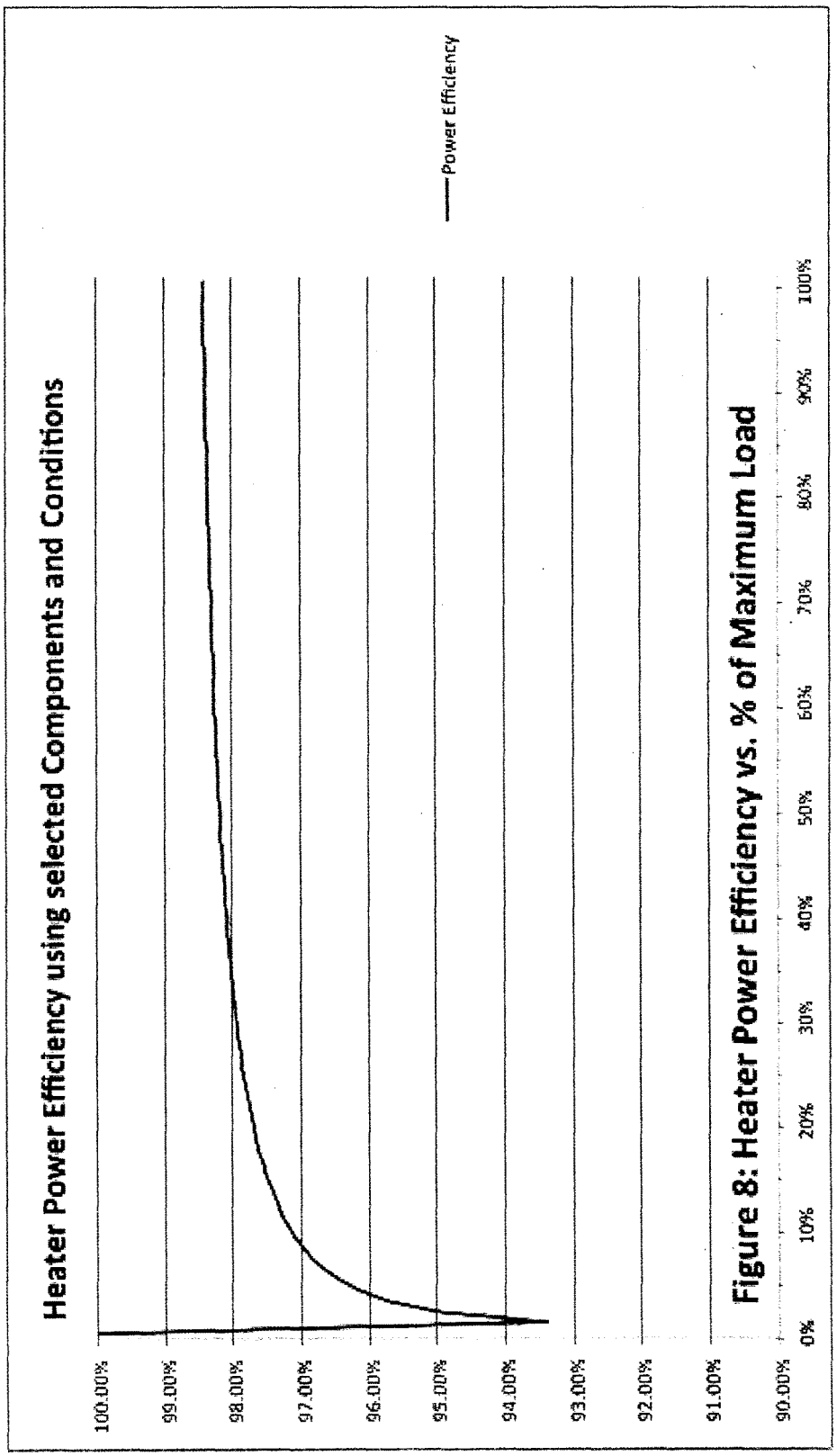
FIG. 8 shows a plot of heater power efficiency vs. percent of maximum load for this demonstration example using values from datasheets of selected components and conditions, including junction operating temperatures.

FIG. 7 shows a simplified chart derived from FIG. 6 that illustrates the voltages produced by both 3-phase and 2-phase (same as single phase when only two phases utilized) rectified to produce the maximum power for each. It can be noted that the choice of 220 VAC at 60 Hz was selected for demonstration purpose only. Other distribution voltages or frequencies are also within the scope of the current subject matter FIG. 8 shows a single line plot detail chart of net power efficiency for the example implementation discussed herein plotted against the percent of line power drawn to achieve the power specified to be delivered to the load. This plot demonstrates that very high efficiency (up to 98.5% at maximum load) can be retained even when operating under part-load conditions (about 92% efficiency at 1% of maximum load). An average of about 97.5% conversion efficiency can be remarkably consistent over a wide range of load control variations. These output loads can be potentially time-variant and dependent upon the resistive load group's programmed multi-cycle waveform composition.

This result can be contrasted with common switch-mode control designs that have nearly the same maximum load efficiency, but can quickly drop in operational efficiency under the low part-load conditions needed for operation over the complete dynamic control range. Additionally, many switch-mode power supplies are unable to function stably at very low loads (less than 10% of maximum load in some designs, and about 1-3% of maximum load for most of the remainder).

Figure 9:
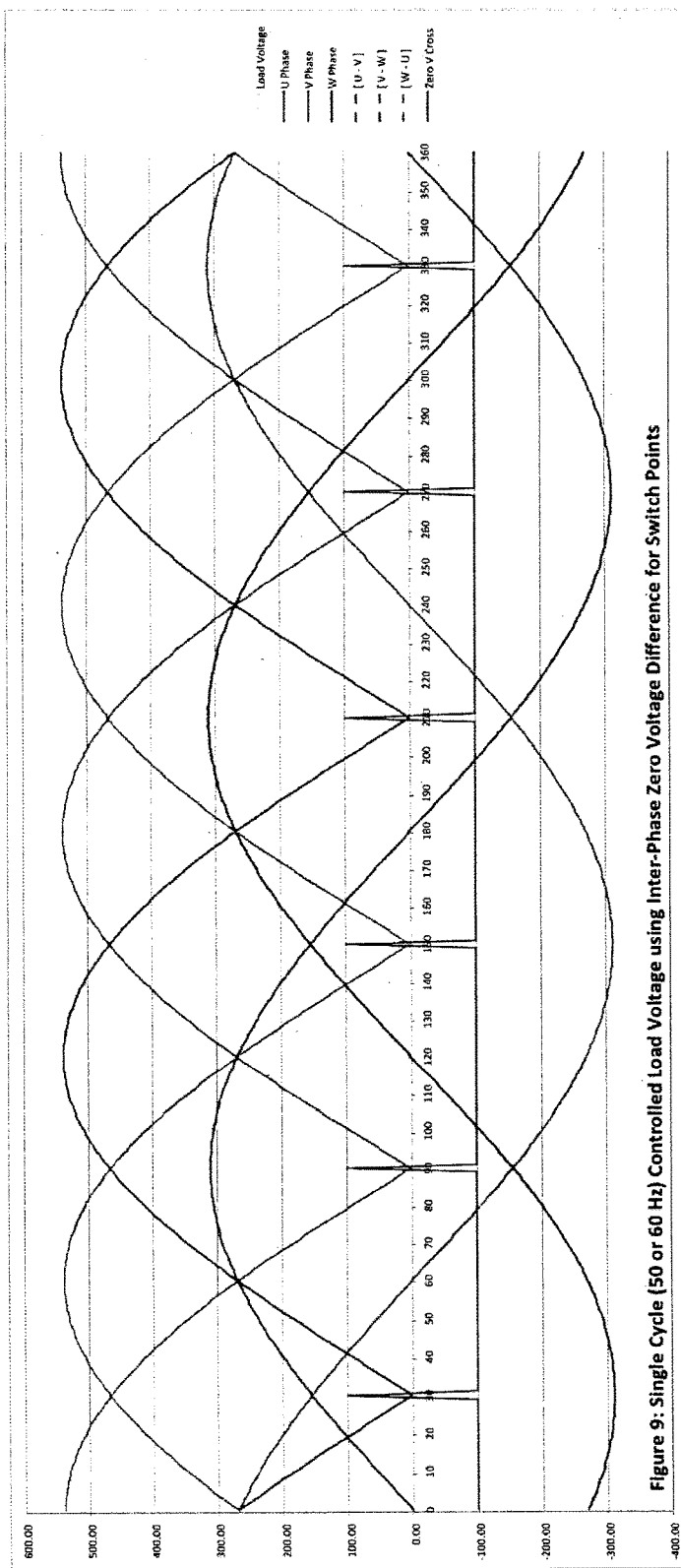
FIG. 9 shows a model of the available operating electrical/electronic voltage crossing switch points that includes interactive display of the drive side voltages and the percent of full load that the selected waveform would deliver to the heaters. It also calculates the resulting power efficiency when the electronic forward voltage drops of the control electronics are accounted for to give the true line/load power delivered to the heaters.

FIG. 9 illustrates features of a dynamic model of the available operating electrical/electronic voltage crossing switch points that includes interactive display of the drive side voltages and the percent of full load that the selected waveform being modeled would deliver to the implementation specific heaters. The model can also calculate the resulting power efficiency when the electronic forward voltage drops of the control electronics are accounted for to give the true line/load power delivered to the heaters.

This tool can permit a user to visualize single supply cycle segment control effects on effective load power, operational efficiency, and supply phase utilization and balancing for the waveform chosen. The implementation mode that utilizes intra-cycle switching can be reserved for finer load ramping control during automated transitions of the quantity of load power taken by the preferred embodiment. These waveforms with their unbalanced phase loads can also be utilized to perform some degree of inter-phase load balancing locally when applied with regular periodicity.

In various implementations of the current subject matter, one or more of the following features can be included in any feasible combination. Implementations can be used with any input power source, independent of the power frequency (50 Hz, 60 Hz or other). Each of one or more resistive heater elements can operate on rectified three phase AC for maximum power output at the rated voltage, or can operate on a single phase with reduced power output and implementation complexity for the same rated supply voltage. A system implementing features of the current subject matter can present itself as a nearly pure resistive load to a single phase or three phase source. Each resistive element group can be phase voltage difference zero-cross switched up to 6 times in 1 cycle for 3-phase power sources.

In a more specific implementation, a system featuring 6×60 Hz can provide 360 switching opportunities in 1 second for 3-phase, while 2×60 Hz can yields 120 switching opportunities in 1 second for single phase power. The large number and frequency of available switching opportunities can permit high resolution, variable speed ramping up or down of resistive load groups to reduce or eliminate large transients typical of high power load changes.

Zero voltage load phase differences can be provided at switching to minimize thermal shock to resistive loads and control electronics. Systems and methods consistent with implementations of the current subject matter can be scalable from 220V to 440V with today's HV/A bridge components and can be scalable to even higher voltages as the state of the art presents opportunities for doing so. High tolerance can be provided for transients coming from the grid due to utilization of zero-voltage switching and high speed transient detection. High power efficiency can be achieved in various implementations, for example by using high voltage Silicon Carbide (SiC) diodes and IGBTs to control 3-phase 220 VAC. FIG. 8 illustrates a 3-phase implementation example with the total efficiency calculated for loads ranging from 0% to 100% in 1% increments.

In some implementations, no single element need represent a load of more than 6 kW (600 V times 10 Amps) to preserve design margins and enable cost effective heater load element group to HV/A bridge ratio. As many (100 or more, for example) resistive heater elements can be utilized as necessary to achieve higher true electrical load control precision as desired or needed. Scalability can be provided by using multiples of heater element groups with the associated rectifier bridge and DSP controller for each resistive load group. Separate DSP controllers can give operational redundancy to enhance fault tolerance. Multiple arbitrated master controllers can give operational redundancy to further enhance fault tolerance.

Master controllers can be capable of measuring effective heater temperatures and scaling back power delivered to the load to reduce or eliminate temperature faults as a heater temperature nears maximum. This approach can provide benefits of reducing or eliminating sudden shut off of high loads when operating margins are reached. High resolution power loads can be presented to the grid's distribution network to permit time based ramping to bring the effective load level upwards or downwards, thereby allowing central control (ISO or other responsible entity) to directly manage very large, remote loads with little or no electrical transient injection onto any common points of connection. Three-phase power sources can enable partial control of each phase's load independently, thereby permitting some voltage regulation to balance a utility load (if commanded from an ISO or other responsible entity). "Islanding" in micro-grid or other small generation/load systems or sub-systems can permit localized master load controllers to perform load following and matching if enabled.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The 3-phase heater control block diagram of FIG. 3 illustrates four high voltage/current rectifiers with control gates having a circuit arrangement as shown in FIG. 2. A preferred form of this 3-phase heater control block would be to have a minimum of ten such high voltage/current rectifiers with control gates. By providing ten such arrangements, each having an associated resistive load and the ability to selectively activate any of these 10 units, achieving the heater power efficiency percentage of maximum load as generally indicated in FIG. 8 is possible.

Each of these individual systems operates most efficiently at maximum power but at a very high efficiency at 40% or greater (see FIG. 8). At a maximum power setting each of the control gates A, B and C of the rectifier are on and the circuit is essentially at maximum efficiency. Given that the gates A, B and C for each controller can be activated multiple times within a full cycle of the input signal the resulting DC signal provided to the resistive load is finely controlled. The fine control of such controller further improves the combination when multiple controllers are activated. Selective activation of the various gates provides precision of the DC signal provided to the various resistive loads. The control arrangement activates the switch at advantageous times (zero crossings) to reduce or eliminate switching transients that may be detrimental to both a supply grid and/or the resistive loads and control circuits. Basically the arrangement allows control of excess power on the grid or produced by a variable generating source (such as solar and/or wind) and uses the excess power for thermal energy storage. The ganging of these controllers and the associated series of resistive loads thereof allows for incremental adjustment of the connected load. In the example of ten such high voltage current rectifiers with control gates, this provides a 10 segment scalable system. The efficiency of this arrangement when only one rectifier is connected and operating at 10% or more is in excess of 93%. More commonly a single controller can operate in excess of 98% efficiency if 40% of the maximum load is connected. Operating multiple controllers provides the operator or control logic additional refining to increase efficiency.

With this arrangement the net resistive load that is connected to the AC power mains is finely adjustable such that overall efficiency can be high. This arrangement provides sufficient control and advantageously provides high efficiency as thermal circuitry loss is low. As additional units are activated (i.e. additional resistive loads are connected to the mains) it is possible to operate the combined circuits to provide a higher combined efficiency. For example, if it is desired to connect 55% of the resistive load it may be desirable to operate 6 of these units at approximately 90% to achieve the 55% load. It is also possible to run some of the units at 100% load and others at a lesser amount. As can be appreciated the combined system can be varied to improve overall efficiency while remaining highly responsive. The optimum combination of these elements and an efficient manner of operating thereof at different efficiencies will be known when the particular components and the characteristics thereof are set for the particular application.

One of the advantages of the present system is that it is incremental and scalable where some of the components can operate in a very efficient range and one of the components can operate at a less efficient range but provide a desired partial load to be connected. The less efficient partial load and any losses thereof are effectively averaged out against the other incremental loads that are operating at high efficiency or by balancing thereof.

The system as shown in FIG. 3 includes the digital signal processor with the analog to digital converter sensors and phase lock loops. Basically each of these units provide precise control over the individual incremental load units.

With this particular design it is also possible to quickly connect or disconnect loads from a power grid in response to variations thereof (highly responsive). It is further possible to use this type of arrangement to modulate the output power provided by a solar system or wind power generation system to a power grid by using the highly responsive thermal storage system. Solar and wind generation systems have widely varying fluctuations in generated power that otherwise can significantly disrupt the power grid. This type of power storage and balancing arrangement can be provided in association with the output of such fluctuating systems to reduce excess or fluctuating power supply problems.

In the preferred embodiment of the invention the resistive loads associated with each of these controllers are used to heat a graphite storage body. The graphite storage body can have a series of these resistors appropriately distributed within the graphite body for efficient thermal energy transfer. Each of the resistors is a thermal resistor which, when exposed to power, heats and transfers the heat energy to the graphite body. These types of thermal resistors are essentially purely resistive and do not have any appreciable reactive components. This pure resistive characteristic is particularly desirable for use with a power grid and the operation thereof. Providing a host or series of these thermal resistors allows for even distribution of the heat within the graphite body.

The present arrangement uses a high power rectifier having a control arrangement that comprises two or more (preferably 10 or more) power controllers ganged together in parallel where each power controller selectively rectifies the AC signal using zero voltage crossing switching to produce a binary switched signal. Each power controller is connected to an independent connectable load and each power controller includes a fast acting binary power switch controlled to connect the respective independent connectable loads to the rectified AC voltage signal. The control arrangement selectively activates the power controllers to define a desired connected load.

The high power rectifiers disclosed herein allow connection of multiple resistive loads to an AC power source and are particularly advantageous for the management of power grid systems or power generation systems. The high power rectifier in combination with the other components allows fast response to compensate for variations in the grid or power source. In a preferred embodiment where the thermal storage body is also connected to a power generator it is possible to run the power generation system to respond to sudden decreases in the power available on the grid. There may well be applications where it is desirable to run the combined system such that it is generating power as well as taking power from the grid. The ability to bring thermal storage energy online to a grid or supply network is faster than conventional gas or hydro generation systems however it still requires significant start-up times that may be in the order of at least 15 or 30 minutes. By having the thermal system already producing power and having the high power rectifier arrangement and other components used to rapidly receive AC power from the grid system provides a responsive system that can provide power when required or quickly take power.

As can be appreciated from the discussion above, the ability to provide power quickly is difficult however by having a system already providing some power to the grid and the ability of the present system to quickly take power from the grid allows for effective management of the grid. The arrangement also is able to address issues associated with wind or solar generation where considerable variation in the output load is expected and highly variable. The present system is able to quickly respond such that the net power provided to the grid from such a source can be consistent and managed.

Figure 10:
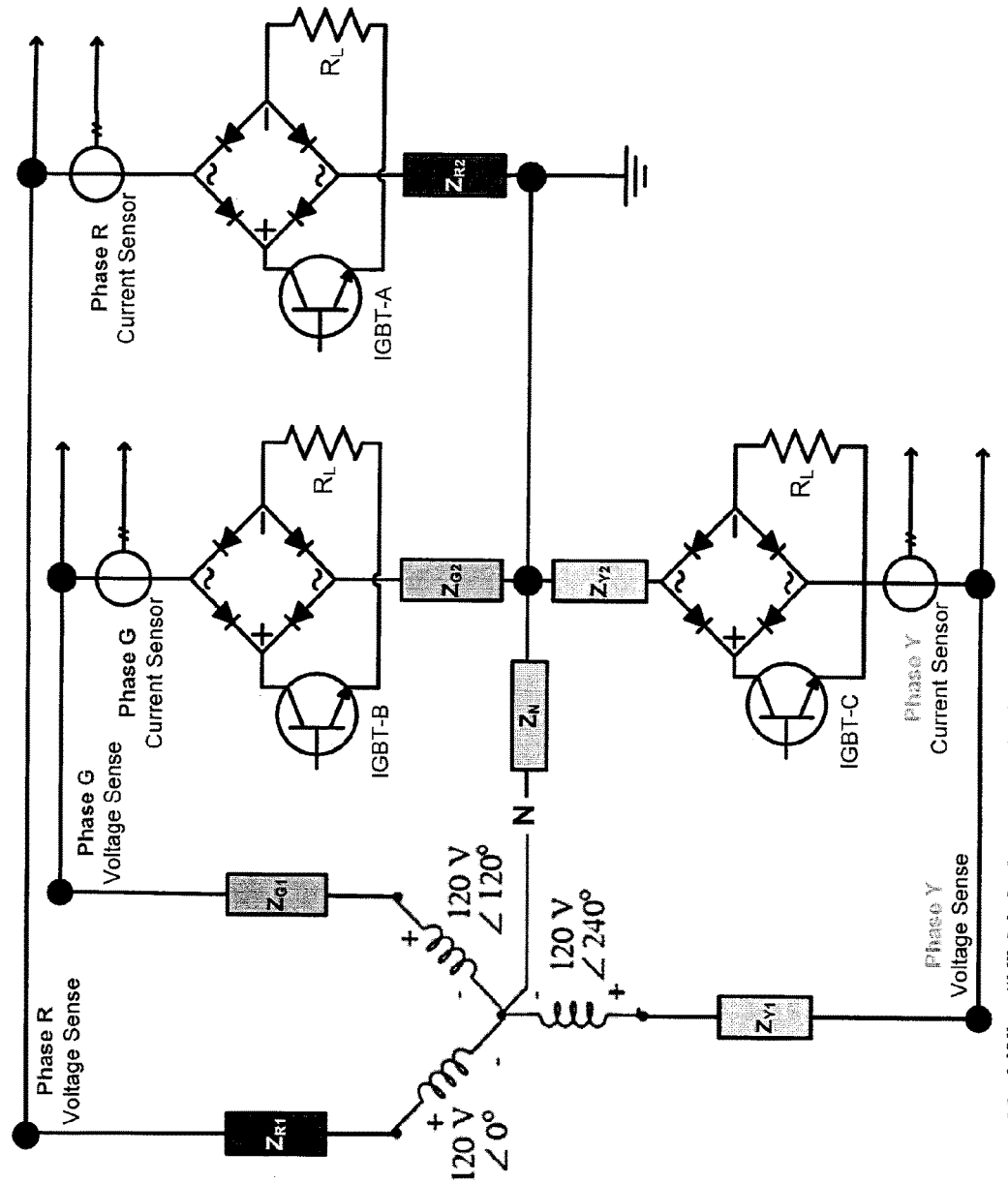
FIG. 10 is a circuit diagram of a 4-wire 'Y' 3 phase full wave rectifier with load resistors.

Various options are possible for the three phase independently controlled full wave rectifier used in association with providing power to the load resistors. FIG. 10 shows a 4-wire 'Y' 3 phase independently controlled full-wave rectifier with various load resistors. This circuit is similar to FIG. 2 that shows a 'delta' configuration. Each of the 3 phases can be controlled independently to have different apparent loads and provide simple main voltage balancing that is always in phase with each individual power line as shown in power ramp graph of FIG. 15. This particular full-wave rectifier circuit is a Class E rectifier that compensates for neutral current transients and provides a higher power factor. For example, the delta design of FIG. 2 will typically have a power factor of between 0.92 and 0.97. The Class E rectifier of FIG. 10 has a higher power factor due to the compensation for neutral current transients.

Figure 11:
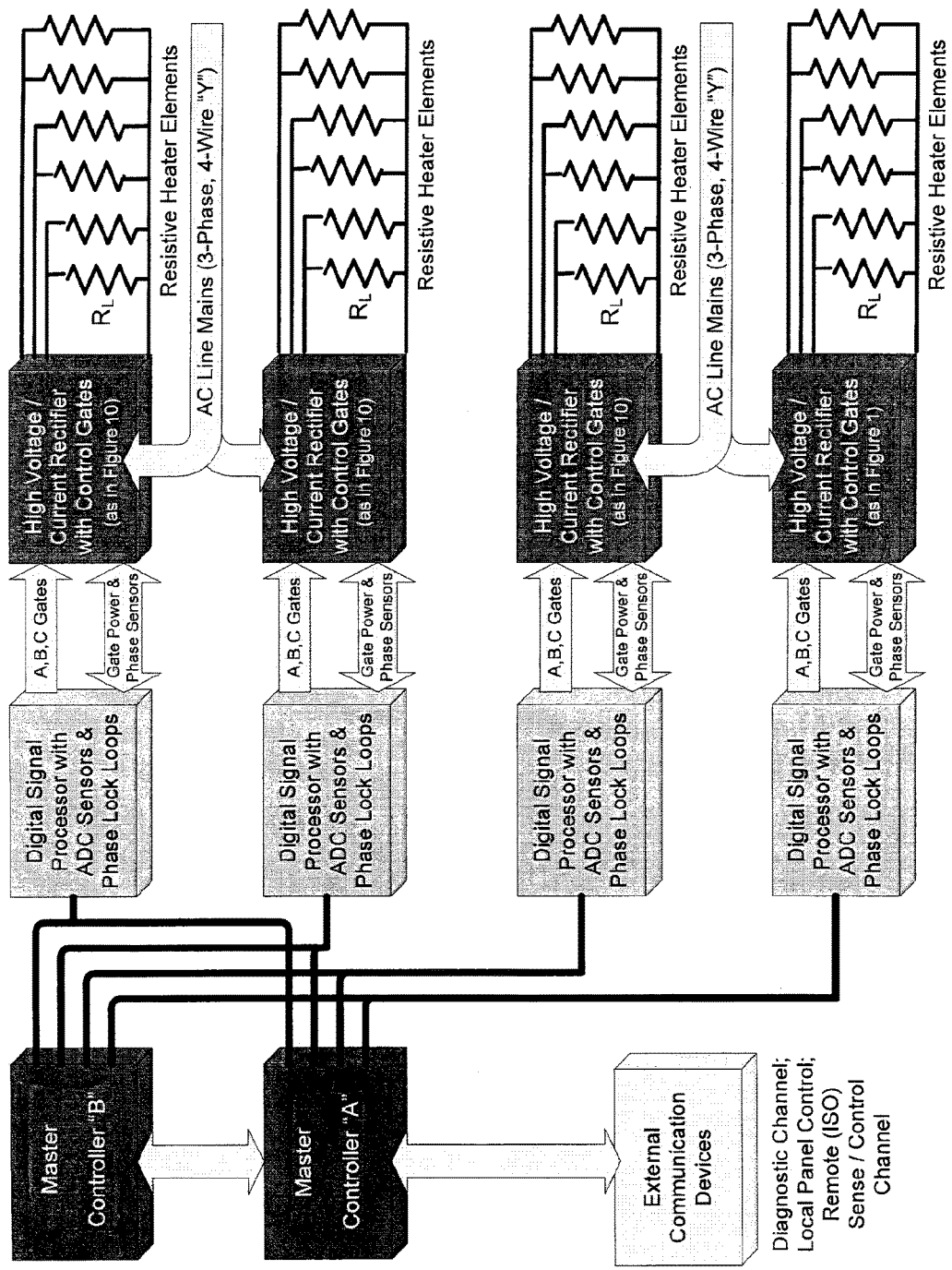
FIG. 11 is a schematic showing a modular block control system for a resistive heating arrangement.

FIG. 11 is similar to FIG. 3 however it uses the Class E rectifiers as shown in FIG. 10. This system and the use of the Class E rectifier will provide a higher power factor and this is a key consideration for any equipment that is to be connected to a power grid. As previously described this system uses multiple discrete zero voltage crossing load controllers for setting of the apparent load value.

FIG. 11 illustrates the embodiment where, the number of resistors per control line, the number of controllers, and the variation in voltage and current capacity for setting the range of unit power, is only limited by available power of semiconductors that can be implemented for the desired load and resolution. This provides a further degree of control that has not previously been readily available for power grid applications.

It should be noted that each of the 3 phases can be controlled independently and therefore this arrangement can be used as part of a voltage balancing or phase balancing procedure. The system provides voltage control which is also of assistance to management of a power grid supply network.

Figure 12:
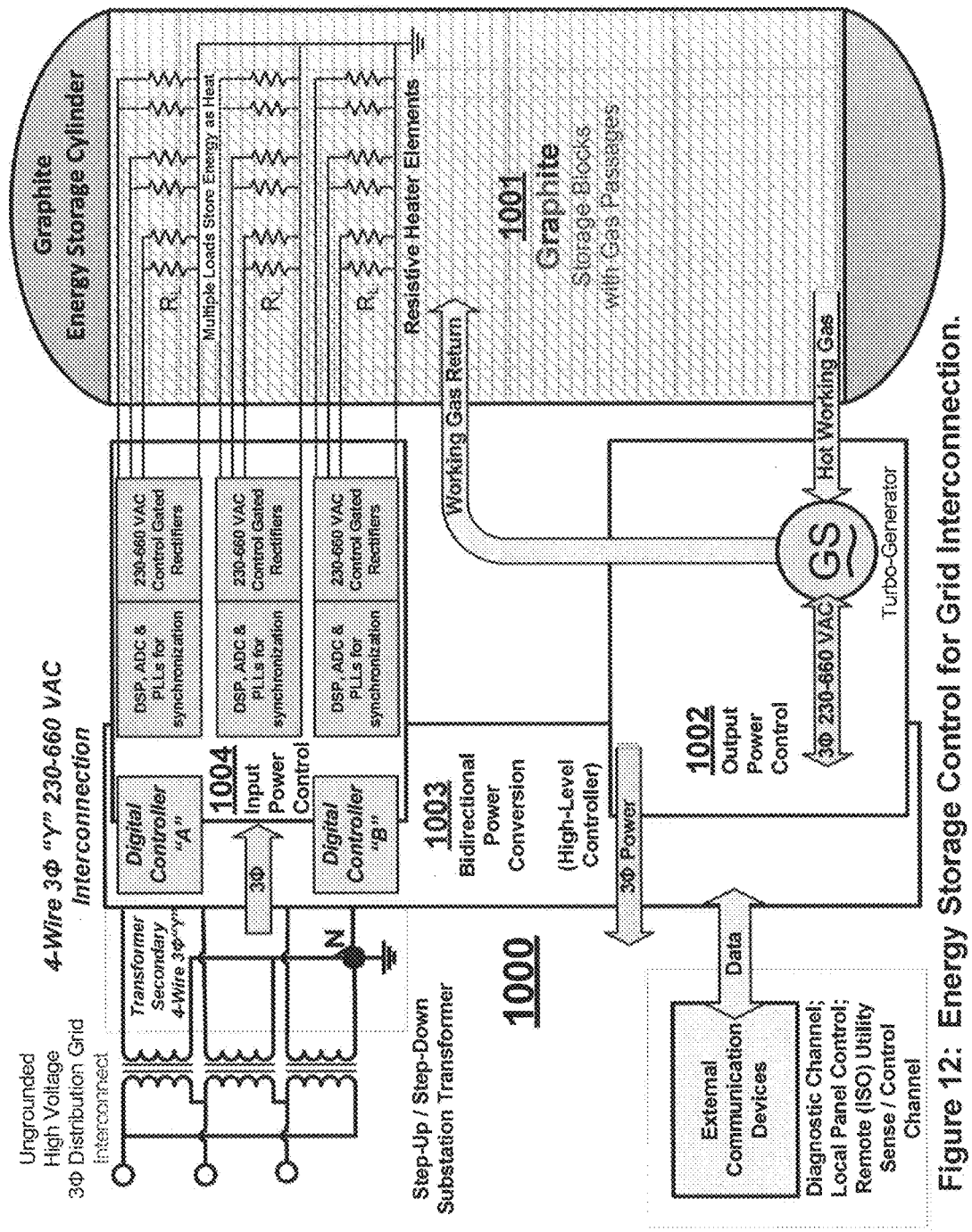
FIG. 12 is a schematic of a system including the resistive heating arrangement of FIG. 11 in combination with a thermal energy storage system and associated turbo-generator.

FIG. 12 shows a further embodiment of the system where the resistive loads are associated with a graphite storage body 1001 and the various resistive elements 1031 are associated with part of the graphite body and provide effective thermal transfer of energy thereto. The graphite storage body 1001 also connects to asynchronous turbo generator 1002 which is essentially powered by the thermal energy retained in the graphite storage body 1001 and transferred via a conductive gas loop 1033. The ability of this system to rapidly take power from a power grid is possible due to the particular rectifiers and control arrangements previously described and the resistive heaters. The synchronous turbo generator 1002 is used to generate power based on energy that was previously stored in a graphite storage body 1001 and can provide this energy to the power grid. The responsiveness of the synchronous turbo generator 1002 to rapidly supply power to the grid is not particularly high. However, by operating the system shown in FIG. 12, the ability to take energy from the power grid or take energy from the output of the synchronous turbo generator is possible using the control arrangement 1004. Basically the synchronous turbo generator 1002 operates within its designed operating parameters and the control arrangement 1004 can determine whether all or any portion of this power should be returned to the graphite storage body. For example, at a particular point in time the power grid may not need all of the power being generated by the synchronous turbo generator 1002. Therefore, although the synchronous turbo generator operates within its predetermined range, the amount of power that is provided to the grid can be rapidly varied. The system generally illustrated in FIG. 12 is able to rapidly respond to the variations of a power grid network to provide or remove power therefrom, and to do so while shaping the phase frequency.

With respect to the system of FIG. 12, it is preferable to run the turbo generator when a substantial portion of the generated power is provided to the power grid. There is always a loss of power in recycling the generated power, however the flexibility to quickly respond to variations in the grid may justify operating the system such that the turbo generator and the output thereof is not wholly supplied to the grid but is ready to do so. There may be other operating times where the output of the turbo generator is primarily provided to the grid, however to even or balance the requirements of the grid, some power is recycled.

Figure 13:
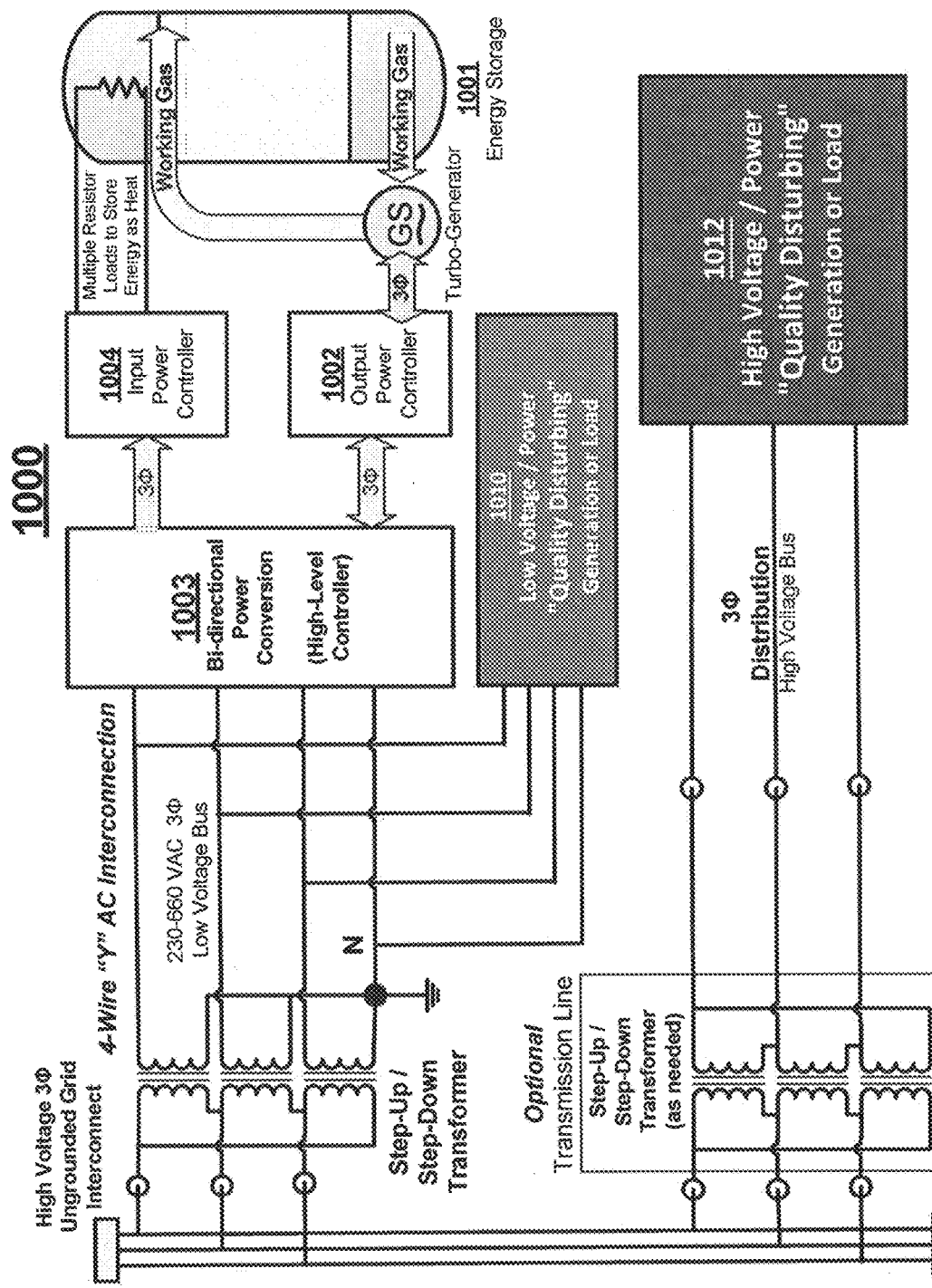
FIG. 13 is a schematic of the system of FIG. 12 in combination with both a low voltage and high voltage fluctuating generation or load.

FIG. 13 effectively shows the system of FIG. 12 in combination with a low voltage power quality disturbing generation or load 1010 and/or a high voltage power quality disturbing generation or load 1012. The power generation and storage system of FIG. 12 is advantageously used to compensate for the power variation disturbing factors caused by the low voltage power quality disturbing generation or load 1010 or the high voltage power quality disturbing generation or load 1012. With respect to the high voltage power quality disturbing generation or load 1012, these variations would be sensed (typically by the controller 1004) and the storage and generation system would respond to the sensed conditions.

Figure 14:
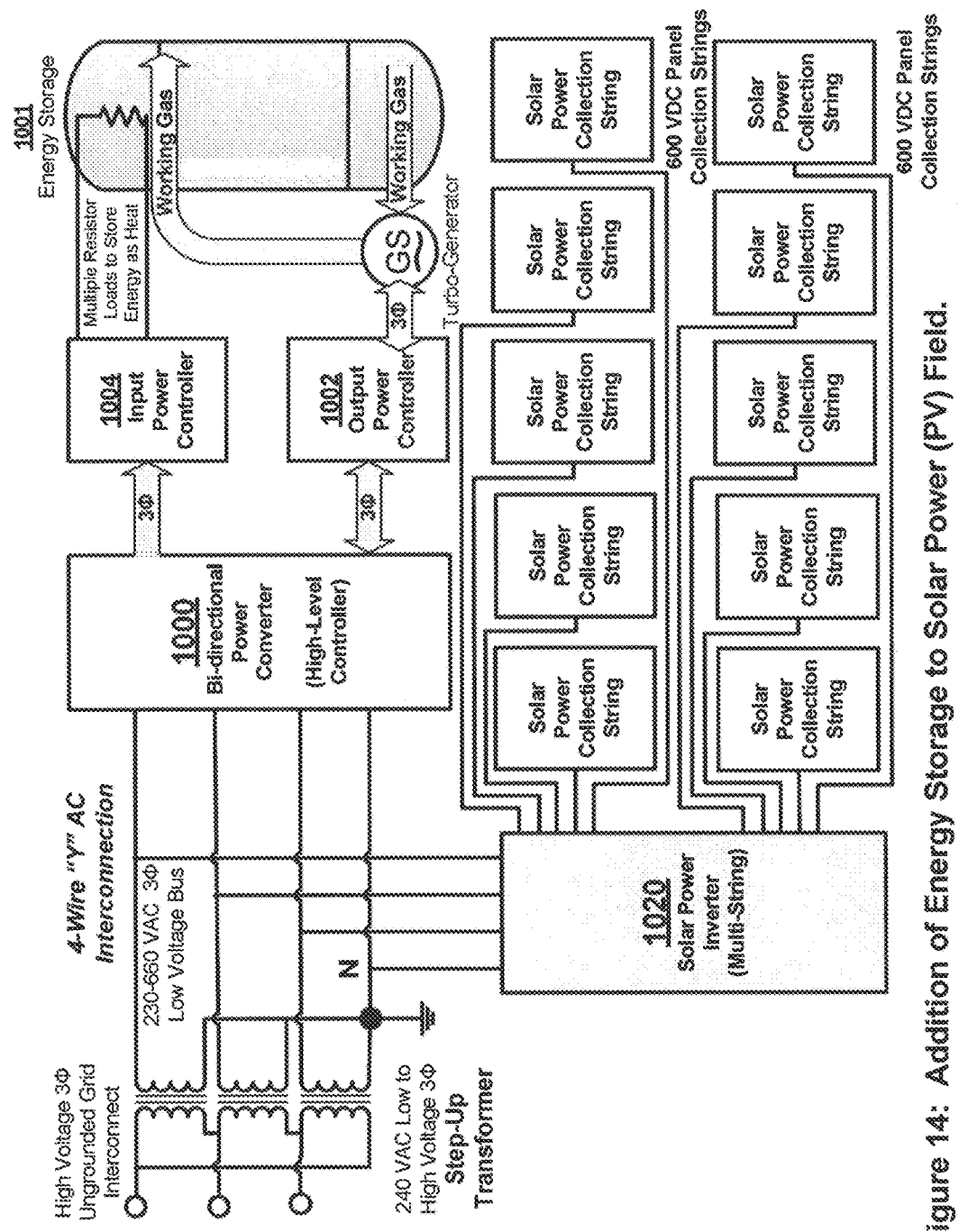
FIG. 14 is a schematic of the system of FIG. 12 in combination with a solar power generation system.

A particular application of the system of FIG. 12 is shown in FIG. 14. In this case the system is shown in association with a solar power generation system 1020. Solar generation systems and the output thereof are known to widely fluctuate and when directly connected to a power generation grid, other components on the grid must try to compensate for these difficult fluctuations. The ability of gas turbines or coal powered turbines to provide fill in or compensation power is presently being used, however this arrangement is not particularly effective or environmentally sound. The thermal storage and power generation system of FIG. 12, when used in combination with the solar generation system 1020, is able to compensate for these solar combination fluctuations and thus the power provided to the grid is more easily controlled. This combination provides substantial advantages to the management of the grid.

Although a solar generation system 1020 is shown, it can be appreciated that wind generation has similar fluctuating power outputs that require compensation. The present thermal storage in combination with power generation and the ability to quickly respond to both take and/or provide power can advantageously be used with wind generation systems or other fluctuating power generation sources.

Figure 15:
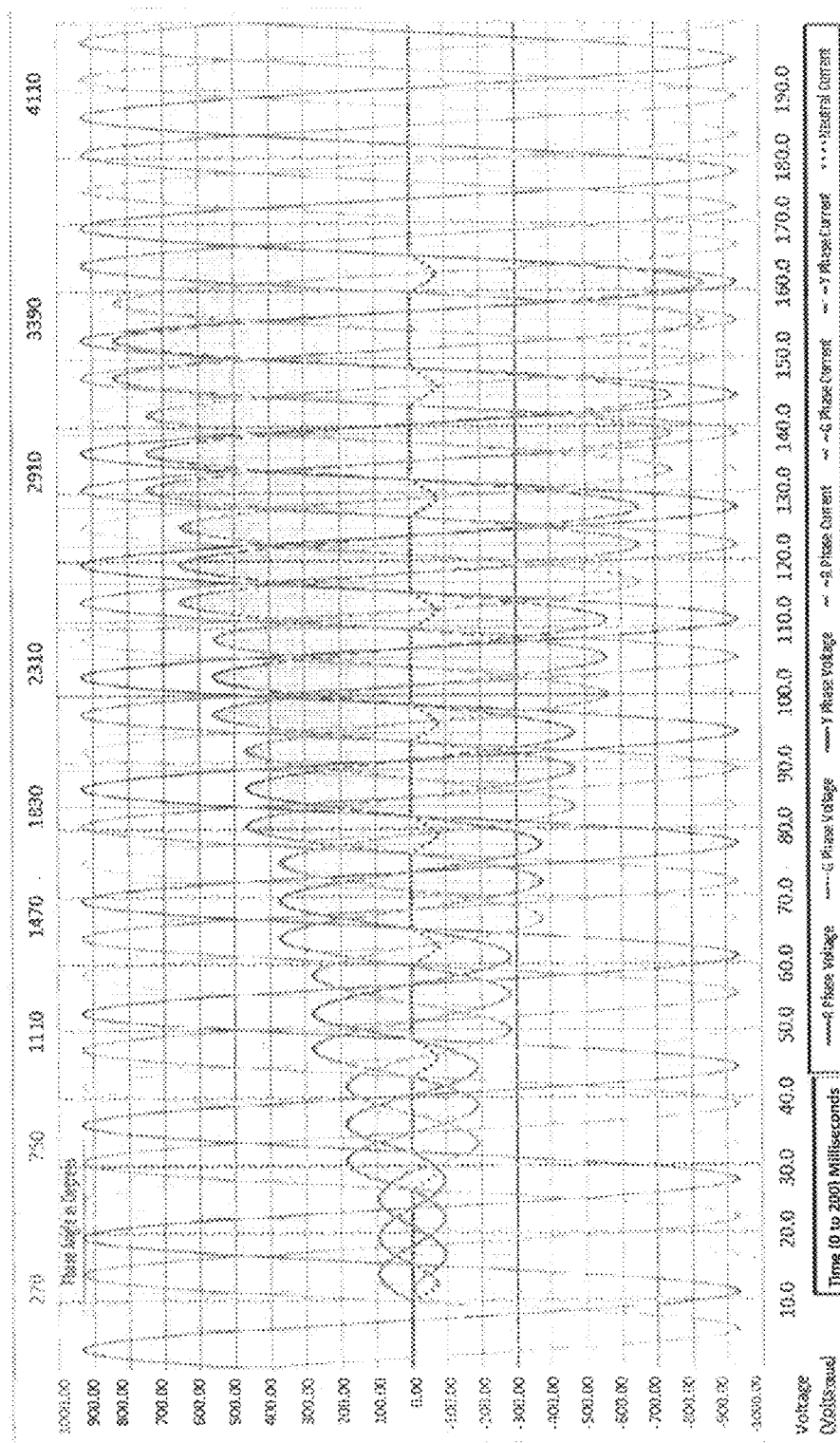
FIG. 15 is a three phase 660 VAC 10-step power ramp possible by selective activation of 10 resistive heating loads for a transition from 0 to 700 KW in 160 milliseconds.

FIG. 15 illustrates the use of 10 resistor controllers to switch between 0-700 KW of resistive load in 10 increments of 70 kW each with this arrangement providing a 10% control resolution. The controllers are each sequentially actuated in less than a 160 millisecond period to provide a smooth ramping of the power that is being stored in the thermal energy storage body. With this arrangement the total load is taken from the grid in a non-destructive manner yet the ability is able to quickly take excess power. The controllers can also be operated to provide a longer transition period or can be selectively activated to take a desired power from the grid or a desired power from the grid and a further generation source.

Figure 16:
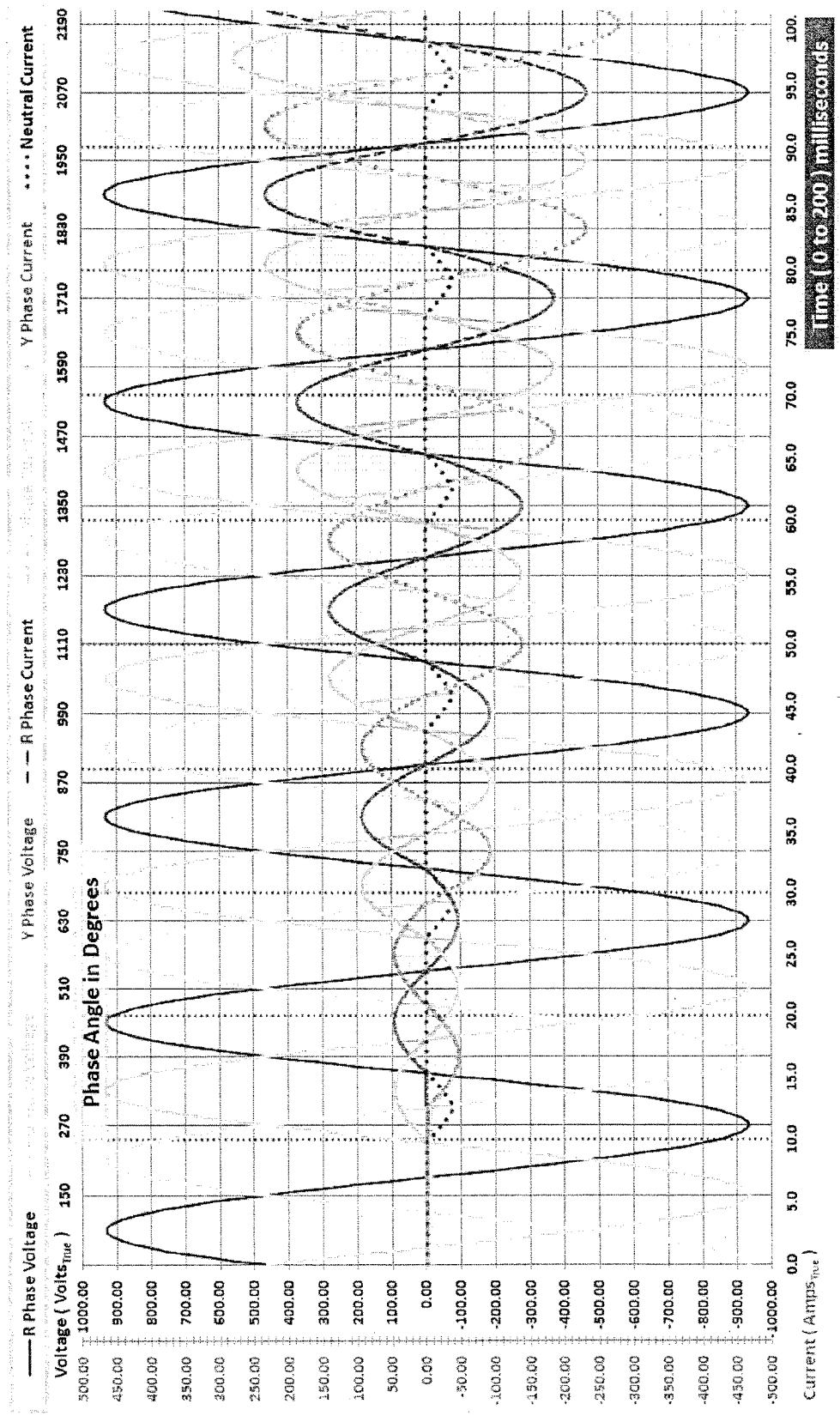
FIG. 16 is an enlargement of FIG. 15 with respect to the time period 0 to 100 milliseconds.

FIG. 16 is the same as FIG. 15 however shows the period from 0-100 milliseconds in greater detail.

The energy storage and generation system 1000 of FIG. 12 as well as the other described applications, can advantageously be used to receive or provide power to a power grid. This system includes independent generation of power to deliver power to the grid but also allows for the vast taking of excess power as previously described. The system combines the fast response input loading of the thermal energy storage system in combination with a turbo generator to perform fast precision up regulation to the maximum output power of the generator and down regulation to the generator power minus the maximum input loading. If the generator is not operating the system can perform fast precision down regulation based on the performance of the thermal energy storage system.

It can be appreciated that the particular combination of the power generation and the ability to store thermal energy quickly as shown in FIG. 12, 13 or 14 need not have all the components located together. For example, the fast up down regulation of the thermal energy storage system can cooperate with a power generation source that is already on the grid that has the responsibility to attempt to compensate for fluctuating generation sources such as a solar generation source. The fast down regulation of the thermal energy storage system can quickly adjust for changing conditions on the power grid.

It can further be appreciated that although references are made to a Turbo Generator which converts thermal energy to electrical energy, any Heat Engine or combination of Heat Engines may be similarly deployed depending upon installation size, ramp rate requirements, efficiency targets, and available capital. For example, to support a grid totally powered by renewable energy, 50 to 150 GWh storage installations would include 500 MW to 1 GW steam turbines designed to operate at peak periods or periods where little wind and solar power was available. These large turbines are also necessary to energize major transmission corridors after a blackout, and as enabled by the present invention, these turbines could also operate during periods of strong renewable generation with the surplus energy being continually drawn back into thermal storage. Large storage installations would preferably opt to run smaller auxiliary turbines while keeping larger turbines warm during such periods where confidence in weather forecasts for consistent renewable production was high. The smaller turbines act as an emergency system such that any serious collapse or blackout of the grid would not leave the storage facility without power and thus unable to power a full grid restoration.

The present system can dynamically vary the amount of energy it is pulling from the grid by selectively energising heaters within the thermal storage module. For short periods, the system can take a high output rate by energising all heaters at 100%. Normally, energy used for thermal storage is rotated amongst all heaters registering graphite temperatures lower than an average graphite temperature so that the load on the grid dynamically follows surplus availability and pulls down voltage spikes such that the graphite core is evenly reheated. At any given time, only some of the heaters may be engaged, and preferably not to the full duty cycle of the given heater. The circuitry for any given heater is thus also not run at its maximum current, increasing lifespan by decreasing circuit temperature.

In cases where a renewable-fed grid is swinging from surplus to deficit energy, as is typical of intermittent wind levels or clouds moving across the sky over a solar grid, the system can operate in a high adaptability mode. In this case, circulation fans which move gas through channels in the thermal core, will spin up to bring the heat exchanges to operating temperature and one or more turbines will spin to speed with lightly loaded generators. Electricity generated will be routed back into the heaters combining with electricity coming off the grid in periods of sunshine or high wind. However, as soon as the clouds begin to cover the solar field (or solar cells throughout a city) or wind level fall and grid voltages begin to drop, the system will automatically, and progressively reduce its load on the grid to match solar production fall off—then, as required, start pushing energy onto the grid from the turbine while proportionally increasing the speed of the gas recirculation fan and retuning the gas mixing valve within the containment module to ensure that appropriate heat energy is available at the heat exchanger for turbine power as generation load increases.

When the cloud clears and solar production surges (or wind production resumes after a lull), the control systems will dynamically and quickly reduce power output to the grid by rerouting electrical energy from the turbine/generator back into the graphite heaters and then also begin to take any surpluses off the grid, again adding this energy to generator energy going back into the graphite. At the same time, the control system will throttle back the gas recirculation fan and retune the gas mixing valve to reduce turbine/generator output. The system as described can also be used as a mobile system (such as a ship) to address temporary or emergency applications.

Although various preferred embodiments of the invention have been described herein in detail, it will be appreciated by those skilled in the art, that variations may be made without departing from the claimed invention.

What is claimed:

1. In a high power rectifier, a control arrangement comprising a series of power controllers ganged together in parallel wherein each power controller includes a controlled 3 phase rectifying circuit that receives an AC voltage signal and the controlled 3 phase rectifying circuit is triggered at zero voltage crossing points to produce a full wave rectified signal powering an independent resistive heating load without reactive loading; and each power controller includes 3 fast acting binary power switches selectively connecting the respective independent resistive heating load to the full wave rectified signal; and wherein said control arrangement includes logic controlling said fast acting binary switches and selectively activating said power controllers to collectively define a desired aggregate connected resistive load determined by the activated power controllers.

2. The control arrangement as claimed in claim 1 wherein each independent connectible resistive heating load converts the full wave rectified. AC voltage signal to thermal energy stored in an energy storage system.

3. The control arrangement as claimed in claim 2 wherein each independent resistive heating load includes a series of resistive elements distributed within said energy storage system and cooperating with said energy storage system to efficiently transfer thermal energy from said resistive elements to said energy storage system; and wherein said control arrangement is capable of switching each binary power switch multiple times within a cycle of the AC voltage signal and wherein the AC: voltage signal is 3 phase.

4. The control arrangement as claimed in claim 3 wherein said series of power controllers are at least 10 power controllers.

5. The control arrangement as claimed in claim 3, wherein said control arrangement includes control logic for incrementally activating said power controllers to dynamically increase or decrease loading of said energy storage system in a predetermined manner to reduce transients caused by connecting or disconnecting separate loads to or from the energy storage system.

6. The control arrangement as claimed claim 3 wherein said controlled 3 phase rectifying circuit includes a dividing circuit to produce single phase input signals that are subsequently rectified.

7. The control arrangement as claimed in claim 2 wherein said series of power controllers are at least 10 power controllers.

8. The control arrangement as claimed in claim 2, wherein said control arrangement includes control logic for incrementally activating said power controllers to dynamically increase or decrease loading of said energy storage system in a predetermined manner to reduce transients caused by connecting or disconnecting separate loads to or from the energy storage system.

9. The control arrangement as claimed in claim 8 wherein said control logic selectively activates said power controllers one after the other to provide a transition from zero load being connected to said energy storage system to a full rated load being connected to said energy storage system where the full rated load is the summation of the independent resistive heating load.

10. The control arrangement as claimed in claim 1 wherein said series of power controllers are at least 10 power controllers.

11. The control arrangement as claimed in claim 10 wherein each power controller has a maximum rated power of at least 70 megawatts.

12. The control arrangement as claimed claim 1 wherein said control arrangement includes a dividing circuit to provide single phase input signals for each power controller.

13. A power storage and generation system connected to a grid supply network, said power storage and generation system comprising
   a thermal energy storage system connected to said grid supply network for receiving electrical power to the thermally stored within a thermal storage body, said thermal energy storage system including thermal conversion outputting components for converting thermal energy of said thermal energy storage system into electrical energy provided to said grid supply network;
   said thermal energy storage system being divided into a series of thermal storage units with each unit including electrical power input components for receiving electrical power from said grid supply network and converting the received electrical power to thermal energy stored in said thermal energy storage system; and wherein the electrical power input components for each thermal storage unit comprise a power controller that selectively rectifies a three phase AC voltage signal using zero voltage crossing switching to produce a binary switched signal; and wherein each power controller is connected to an independent connectible load that when powered produces thermal energy and each said independent connectible load is associated with one of said. thermal storage units and transfers thermal energy thereto; and wherein each power controller includes a fast acting binary power switch selectively connecting the respective independent connectible load to the binary switched signal; and wherein said electrical power input components selectively activate said power controllers to define a desired connected load.

14. The power storage and generation system as claimed in claim 13 including a power management controller for said series of thermal storage units, wherein said power management controller selectively activates said power controllers in a predetermined manner to provide a power receiving transition period for said grid supply network that reduces switching transients produced by activating any of said power controllers.

15. The power storage and generation system as claimed in claim 14 wherein said independent connectible loads are each a series of thermal resistors distributed within the thermal storage body.

16. The power storage and generation system as claimed in claim 13 further including
   a solar generation source having a series of solar panels, said solar generation source having a variable output dependent upon solar power generating conditions, and
   a DC to AC converter connected to said solar generation source for receiving DC power from said solar generation source and supplying AC power to said grid supply network;
   said power generation system further including an energy control system monitoring said grid supply network and said solar generation source to identify transients or power conditions that adversely affect said grid supply network; said energy control system increasing or decreasing the AC power provided to said grid supply network to partially offset said identified transients or power conditions that adversely affect said grid supply network, said energy control system increasing AC electrical power outputted to said grid supply network by adjusting the output of said thermal conversion outputting components;
   said energy control system decreasing AC electrical power provided to the grid supply network by receiving AC electrical power from said grid supply network or AC electrical power of said solar generation source and providing the received AC electrical power to said electrical power input components to effect thermal storage in said thermal energy storage system.

* * * * *